US010189594B2

(12) United States Patent
Sato et al.

(10) Patent No.: US 10,189,594 B2
(45) Date of Patent: *Jan. 29, 2019

(54) METHOD FOR MANUFACTURING A CONTAINER CONTAINING A CONTENT FLUID, A METHOD FOR PLACING AN INSIDE OF A CONTAINER UNDER A POSITIVE PRESSURE, A FILLED CONTAINER, A BLOW MOLDING METHOD, AND A BLOW MOLDING DEVICE

(71) Applicant: DISCMA AG, Zürich (CH)

(72) Inventors: Sumito Sato, Tokyo (JP); Nobuyuki Tamura, Tokyo (JP); Takeshi Nagashima, Tokyo (JP); Yuichi Okuyama, Tokyo (JP); Kazuhiko Shimizu, Tokyo (JP); Toshimasa Tanaka, Tokyo (JP)

(73) Assignee: DISCMA AG, Zürich (CH)

( * ) Notice: Subject to any disclaimer, the term of this patent is extended or adjusted under 35 U.S.C. 154(b) by 1016 days.

This patent is subject to a terminal disclaimer.

(21) Appl. No.: 14/389,680

(22) PCT Filed: Mar. 28, 2013

(86) PCT No.: PCT/JP2013/059345
§ 371 (c)(1),
(2) Date: Sep. 30, 2014

(87) PCT Pub. No.: WO2013/147065
PCT Pub. Date: Oct. 3, 2013

(65) Prior Publication Data
US 2015/0076105 A1 Mar. 19, 2015

(30) Foreign Application Priority Data

Mar. 30, 2012 (JP) .................................. 2012-079005
Jun. 28, 2012 (JP) .................................. 2012-145408
Jul. 31, 2012 (JP) .................................. 2012-170180

(51) Int. Cl.
*B65B 61/24* (2006.01)
*B67C 7/00* (2006.01)
(Continued)

(52) U.S. Cl.
CPC .......... *B65B 61/24* (2013.01); *B29C 49/4273* (2013.01); *B29C 49/78* (2013.01);
(Continued)

(58) Field of Classification Search
None
See application file for complete search history.

(56) References Cited

U.S. PATENT DOCUMENTS 9,789,641 B2 * 10/2017 Suyama .................. B29C 49/28
2005/0206045 A1 9/2005 Desanaux et al.

FOREIGN PATENT DOCUMENTS

JP A-2000-43129 2/2000
JP A-2002-264912 9/2002
(Continued)

OTHER PUBLICATIONS

May 14, 2013 International Search Report issued in International Patent Application No. PCT/JP2013/059345.

*Primary Examiner* — Monica A Huson
(74) *Attorney, Agent, or Firm* — Eric J. Sosenko; Jonathan P. O'Brien; Honigman Miller Schwartz and Cohn LLP

(57) ABSTRACT

Provided is a method for manufacturing a container containing a content fluid, including: a molding step of stretching a bottomed tubular preform that is heated to a temperature at which the preform is stretchable so as to form the container by means of pressure of the content fluid injected into the preform through a mouth portion; a sealing step of (Continued)

sealing the content fluid by fitting a cap body to the mouth portion; and a pressurizing step of increasing an inner pressure of the container, wherein the container includes an invertible deforming portion that is freely invertible and deformable toward an inside of the container, and in the pressurizing step, the inner pressure of the container is increased by reducing a volume of the container by inverting and deforming the invertible deforming portion toward the inside of the container.

11 Claims, 20 Drawing Sheets

(51) Int. Cl.
  *B67C 3/04* (2006.01)
  *B65D 1/02* (2006.01)
  *B65B 47/08* (2006.01)
  *B67C 3/22* (2006.01)
  *B29C 49/42* (2006.01)
  *B29C 49/78* (2006.01)
  *B29C 49/06* (2006.01)
  *B29C 49/12* (2006.01)
  *B29C 49/54* (2006.01)
  *B29C 49/46* (2006.01)
  *B29C 49/48* (2006.01)
  *B29C 49/58* (2006.01)
  *B29K 23/00* (2006.01)
  *B29K 67/00* (2006.01)

(52) U.S. Cl.
  CPC ............ *B65B 47/08* (2013.01); *B65D 1/0261* (2013.01); *B65D 1/0276* (2013.01); *B67C 3/045* (2013.01); *B67C 3/22* (2013.01); *B67C 7/00* (2013.01); *B29C 49/06* (2013.01); *B29C 49/12* (2013.01); *B29C 49/541* (2013.01); *B29C 49/783* (2013.01); *B29C 2049/4664* (2013.01); *B29C 2049/4892* (2013.01); *B29C 2049/5803* (2013.01); *B29K 2023/12* (2013.01); *B29K 2067/003* (2013.01); *B67C 2003/227* (2013.01)

(56) References Cited

FOREIGN PATENT DOCUMENTS

| | | |
|---|---|---|
| JP | A-2003-251685 | 9/2003 |
| JP | A-2007-269376 | 10/2007 |
| JP | A-2008-201461 | 9/2008 |
| JP | A-2008-254244 | 10/2008 |
| JP | A-2011-527244 | 10/2011 |
| WO | WO 03/095179 A1 | 11/2003 |
| WO | WO 2005/044540 A1 | 5/2005 |
| WO | WO 2007/120807 A2 | 10/2007 |
| WO | WO 2007/127337 A2 | 11/2007 |
| WO | WO 2009/099638 A2 | 8/2009 |
| WO | WO 2010/003871 A1 | 1/2010 |
| WO | WO 2010/080731 A1 | 7/2010 |
| WO | WO 2012/010461 A1 | 1/2012 |

* cited by examiner

METHOD FOR MANUFACTURING A CONTAINER CONTAINING A CONTENT FLUID, A METHOD FOR PLACING AN INSIDE OF A CONTAINER UNDER A POSITIVE PRESSURE, A FILLED CONTAINER, A BLOW MOLDING METHOD, AND A BLOW MOLDING DEVICE

TECHNICAL FIELD

The present invention relates to a method for manufacturing a container containing a content fluid.

The present invention also relates to a method for placing an inside of the container under a positive pressure, and a filled container that contains a fluid therein and that is under a positive pressure state.

The present invention also relates to a blow molding device for a preform, and a blow molding method for a preform.

This application claims priority to and the benefit of Japanese Patent Application No. 2012-079005 filed on Mar. 30, 2012, Japanese Patent Application No. 2012-145408 filed on Jun. 28, 2012, Japanese Patent Application No. 2012-170180 filed on Jul. 31, 2012, the contents of which are incorporated herein by reference.

BACKGROUND ART

As has been conventionally known, there is a method for manufacturing a bottle containing a content fluid, including: the molding step of biaxially stretching a preform in a heated state by injecting the content fluid into the preform through a mouth portion thereof so as to form a bottle; and the sealing step of fitting a cap body to the mouth portion so as to keep the content fluid sealed. (Refer to Patent Literature 1, for example.)

Furthermore, synthetic resin containers that are made of polyethylene terephthalate (PET) resin or the like and are made by blow molding have been conventionally and widely used. Such a container is filled with a content fluid, namely a liquid such as a beverage, and sealed at the mouth portion with a cap, and then, is placed for sale in the stated condition. The product filled with a liquid such as a beverage as described above, with the mouth portion being sealed, is collectively referred to below as a filled container.

From the viewpoint of resource and energy saving, there is a need for further weight reduction of the container of the kind. However, the weight reduction requires reduction in thickness of a circumferential wall of the container. When an inside of the filled container is particularly in a reduced pressure state, buckling strength is deteriorated, possibly resulting in deformation or breakage of the container under load applied during transportation.

Patent Literature 2 discloses a method for preventing deformation and breakage of containers. Specifically, a drip of liquid nitrogen is added into a bottle container when the container is filled with a content fluid and is sealed with a cap. Then, due to vapour pressure of the added liquid nitrogen, the inside of the container is placed under a pressurized state, that is, a so-called positive pressure state.

Patent Literature 3 also discloses a method for blow molding a preform with use of a liquid, instead of air, as a pressure medium.

In the molding method, since a content fluid that is to be filled in a final product may be used as the pressure medium, a filling step may be omitted, and a production line may be simplified.

FIG. 10 is a schematic view illustrating a blow molding device configured to blow mold a preform with use of a liquid as the pressuring fluid.

A part A of the device includes a metal mold 1101, a blow nozzle 1104, and a stretching rod 1108 that is inserted in the blow nozzle 1104 and that is used for vertically stretching the preform. As auxiliary equipment for supplying a pressurized fluid, a pressurized liquid supply unit 1122 and a liquid supply unit 1123 are provided adjacent to the part A.

The pressurized liquid supply unit 1122 is in the form of a plunger pump and operates by utilizing, as a power source, a pressurized fluid Fp supplied from a pressurizing device 1121 such as a pressurizing pump, a compressor, or the like, through a pipe P101. The pressurized liquid supply unit 1122 supplies the pressurized liquid L to an inside of a preform 1031 that is externally fitted to a tip portion of the blow nozzle 1104 tightly, through a pipe P102, an electromagnetic valve V102, and the blow nozzle 1104.

The liquid supply unit 1123 supplies, to the pressurized liquid supply unit 1122 through a pipe R101, the liquid L that is regulated to be a predetermined temperature.

As a result of the vertical stretching by means of the stretching rod 1108, and inflation and stretching by means of the pressurized liquid L, the preform 1031 is shaped in accordance with a shape of a cavity 1102 of a metal mold 1101, and thus, a container 1041 is molded.

With their numerous excellent characteristics, blow molded bottles made of polyethylene terephthalate (PET) resin (so-called pet bottles) have been conventionally used as bottle containers in a variety of fields.

Containers of such a kind are molded by expandingly stretching and deforming a preform that has been inject molded into a bottomed tubular shape, in a state where the preform is heated to a temperature at which a stretching effect is achieved.

In detail, as illustrated in FIG. 20 (which corresponds to FIG. 12 in Patent Literature 4), a preform 2031 that is heated to a temperature at which the stretching effect is achieved is fitted to a blow metal mold 2101, with a mouth portion 2032 being projected upward and with a neck ring 2033 being engaged with a neck support flange portion 2103, the neck ring 2033 being integrally formed around a lower end on an outer circumferential surface of the mouth portion 2032 of the preform 2031. A guide tubular portion 2110, which is a tip portion of a blow nozzle 2105, is loosely engaged into the mouth portion 2032 of the preform 2031. In the above state, the preform 2031 is stretched in an axial direction by means of a stretching rod 2116 that is inserted through an insertion hole 2111 provided through a middle of the blow nozzle 2105, and the preform 2031 is also stretched in a radial direction by means of blow air that is a pressurized fluid supplied to the preform 2031 through the insertion hole 2111. Thus, the preform 2031 is molded into a bottle container 2041.

Patent Literature 3 also discloses an invention of a method for blow molding a preform by using a liquid, instead of blow air, as the pressurized fluid.

In the above molding method, by using a content fluid that is to be filled in a final product as the liquid, a filling step may be omitted, and a production line may be simplified.

CITATION LIST

Patent Literature

PTL 1: JP2011527244A
PTL 2: JP2002264912A

PTL 3: JP2000043129A
PTL 4: JP2003251685A

SUMMARY OF THE INVENTION

Technical Problems

However, when a preform is molded by biaxial stretch blow molding, molding shrinkage might occur depending on characteristics of a material of the preform. In the above circumstance, according to a conventional method for manufacturing a bottle containing a content fluid, due to an increase in inner pressure resulting from shrinkage of the bottle over a passage of time after the sealing step, a bottom portion of the bottle might be deformed to bulge outward. As a result, the bottle might not stand upright.

Furthermore, when the bottle is largely shrunk and deformed before the sealing step, the content might leak out because the bottle is formed while the content fluid is being injected.

The present invention has been conceived in view of the above problems and is to provide a method for manufacturing a bottle containing a content fluid, the method being capable of preventing shrinkage and deformation of the bottle over a passage of time after the sealing step.

Moreover, according to the method for placing the inside of the container under the positive pressure by adding the drip of liquid nitrogen as disclosed in Patent Literature 2, it is necessary to provide a device for filling the container with liquid nitrogen together with the liquid. Accordingly, equipment might be complicated, and cost for purchasing liquid nitrogen might be expensive.

The present invention is to provide a blow molding method that uses a liquid as the pressure medium without utilizing an additional measure such as adding a drip of liquid nitrogen, wherein the inside of the container is placed under the positive pressure without compromising productivity.

Moreover, when, as disclosed in Patent Literature 3, a pressurized liquid is used in blow molding, since the liquid is filled in the container after the container is molded, when the blow nozzle is disengaged from the mouth tubular portion, the liquid might be scattered from the mouth tubular portion to the surrounding outside. In the above circumstance, it is difficult to regulate head space of the content fluid to be a predetermined volume. As a result, products have different head space, and a problem concerning merchantability arises.

In view of the above, the present invention is to provide a blow molding device that uses a liquid, such as a beverage, a cosmetic product, a pharmaceutical product, or the like, that is to be filled in a final product as the pressurized liquid, wherein the head space of a predetermined volume is formed in the container filled with the content fluid at the time of molding, so that leakage of the content fluid is favorably prevented until the step of capping the mouth portion of the container after blow molding.

Solution to Problems

A first aspect of the present invention resides in a method for manufacturing a container containing a content fluid, including: a molding step of stretching a bottomed tubular preform that is heated to a temperature at which the preform is stretchable so as to form the container by means of pressure of the content fluid injected into the preform through a mouth portion of the preform; a sealing step of sealing the content fluid by fitting a cap body to the mouth portion; and a pressurizing step of increasing an inner pressure of the container, wherein the container includes an invertible deforming portion that is freely invertible and deformable toward an inside of the container, and in the pressurizing step, after the sealing step before a temperature of the container decreases to a room temperature, the inner pressure of the container is increased by reducing a volume of the container by inverting and deforming the invertible deforming portion toward the inside of the container.

According to the above method, after the sealing step and before the temperature of the container (bottle) is decreased to the room temperature, the presence of the pressurizing step increases the inner pressure of the container (bottle) and prevents deformation of the invertible deforming portion. As a result, shrinkage and deformation of the container (bottle) over a passage of time after the sealing step are prevented.

A second aspect of the present invention resides in the method for manufacturing a container containing the content fluid according to the first aspect, wherein the invertible deforming portion is formed in a bottom portion of the container.

In the above circumstance, it is ensured that the container (bottle) is capable of standing upright reliably.

A third aspect of the present invention resides in a method for placing an inside of a container under a positive pressure, including: a molding step of molding the container by blow molding using a liquid as a pressure medium; a sealing step, after the molding step, of sealing a mouth portion of the container in a state where the container is filled with the liquid; and a positive pressurization step, after the sealing step, of placing the inside of the container under the positive pressure due to reduction in volume of the container resulting from after-shrinkage of a circumferential wall of the container.

The above method utilizes the blow molding method in which the content fluid that is to be filled in the container is used as the pressure medium. By sealing the mouth portion of the container in the state where the container is filled with the content fluid after the container is blow molded, due to reduction in volume resulting from the after-shrinkage of the circumferential wall of the container subsequent to the sealing, the inside of the container is placed under the positive pressure.

Meanwhile, in a conventional method, a molded container is once stored and is later filled with a content fluid. Accordingly, the mouth portion is sealed at the stage when the after-shrinkage of the container is saturated, and therefore, the after-shrinkage of the circumferential wall of the container may not be utilized for positive pressurization as described above.

A fourth aspect of the present invention provides the method for placing the inside of the container under the positive pressure according to the third aspect, wherein a magnitude of the positive pressure is controlled by setting a temperature of the liquid and a temperature of a metal mold used for the molding step.

Even when requirements of a shape of the container, a synthetic resin used, volume of head space, or the like are restricted, the temperature of the liquid and the temperature of the metal mold used for the blow molding may be arbitrarily changed within a certain permissible range. Accordingly, by changing the temperature of the liquid and the temperature of the metal mold used for the blow molding, the magnitude of the positive pressure may be controlled.

A fifth aspect of the present invention provides the method for placing the inside of the container under the positive pressure according to the third aspect, wherein the container is made of a polypropylene-based resin. The PP-based resin may be molded by biaxial stretch blow molding, and a molded article of the PP-based resin has large after-shrinkage after molding which progresses over a long period of time. Accordingly, the positive pressurization due to the reduction in volume is achieved sufficiently and easily.

A sixth aspect of the present invention provides the method for placing the inside of the container under the positive pressure according to the third aspect, wherein the container is made of a polyethylene terephthalate resin. The PET resin has excellent moldability with respect to biaxial stretch blow molding. Accordingly, the positive pressurization due to the reduction in volume is achieved sufficiently and easily due to the after-shrinkage of the container after molding that is caused by stretch crystallization.

A seventh aspect of the present invention provides a filled container, including: a synthetic resin container containing therein a liquid, wherein the container is formed by blow molding using the liquid as a pressure medium, after the blow molding of the container, the container remains filled with the liquid used as the pressure medium, and when a mouth portion of the container is sealed, an inside of the container is under a positive pressure state due to reduction in volume of the container resulting form after-shrinkage of a circumferential wall of the container after the sealing.

An eighth aspect of the present invention provides a blow molding method, including: a molding step of stretching and blowing a preform in a metal mold by means of a content fluid so as to form a container, the metal mold including a body section metal mold and a bottom section metal mold; and the head space formation step, after the molding step, of forming head space by driving the bottom section metal mold in a direction in which the bottom section metal mold is pulled out in order to invert a bulging shape of the bottom portion of the container and by introducing air to an inside of the container, in a state where the body section metal mold is closed.

After the molding step, the inside of the container is filled with the content fluid, and the container is loaded with an inner pressure of the content fluid which is about to swell the container outward. With the above structure, in a state where the body section metal mold is closed, the bottom section metal mold is driven in the pull-out direction in order to invert the bulging shape of the bottom portion of the container, and the air is also introduced into the container. By doing so, the head space corresponding to the volume change associated with the invertible deformation of the bottom portion of the container is created in the mouth portion of the container.

A ninth aspect of the present invention provides the blow molding method according to the eighth aspect, wherein the bottom section metal mold includes a locking portion configured to be locked into a middle portion of the bottom portion of the container that faces the bottom section metal mold, and in the head space formation step, the head space is formed by driving the bottom section metal mold from the bottom portion of the container in the direction in which the bottom section metal mold is pulled out in a state where the locking portion included in the bottom section metal mold is locked into the middle portion of the bottom portion of the container in order to invert the bulging shape of the bottom portion of the container toward an outside of the container and by introducing the air to the inside of the container.

In the above circumstance, since the bottom section metal mold includes the locking portion configured to be locked into the middle portion of the bottom portion of the container, when the bottom section metal mold is pulled out from the container, the locking portion is locked into the bottom portion of the container, and the bulging shape of the bottom portion of the container is favorably inverted from the inside to the outside of the container.

A tenth aspect of the present invention provides the blow molding method according to the ninth aspect, wherein the locking portion included in the bottom section metal mold is formed in a convex shape whose diameter increases toward a tip thereof.

In the above circumstance, since the bottom section metal mold includes the convex portion whose diameter increases toward the tip thereof, when the bottom section metal mold is pulled out from the container, the convex portion is locked to the bottom portion, and the bulging shape of the bottom portion of the container is favorably inverted from the inside to the outside of the container.

An eleventh aspect of the present invention provides the blow molding method according to the eighth aspect, wherein the bottom section metal mold includes a rod-shaped first metal mold and a ring-shaped second metal mold surrounding the first metal mold, the first metal mold including a tip portion formed in a convex shape whose diameter increases toward a tip thereof, and in the head space formation step, the head space is formed by driving the bottom section metal mold in the direction in which the bottom section metal mold is pulled out in order to invert the bulging shape of the bottom portion of the container toward an outside of the container and by introducing the air to the inside of the container.

In the above circumstance, by pulling out the bottom section metal mold in the two steps for causing the invertible deformation of the bottom portion of the container, the bulging shape of the bottom portion of the container is favorably inverted from the inside to the outside of the container.

A twelfth aspect of the present invention provides the blow molding method according to the eighth aspect, wherein the bottom section metal mold includes a rod-shaped first metal mold and a ring-shaped second metal mold surrounding the first metal mold, and in the head space formation step, the head space is formed by projecting the first metal mold relative to the second metal mold in order to invert the bulging shape of the bottom portion of the container toward the inside of the container and then driving the first metal mold in a direction in which the first metal mold is pulled out in order to invert the bulging shape of the bottom portion of the container and by introducing the air to the inside of the container.

In the above circumstance, by projecting the first metal mold in order to invert and deform the bulging shape of the bottom portion of the container toward the inside of the container and then driving the first metal mold downward in the pull-out direction, and by introducing the air to the inside of the container, the head space corresponding to the volume change according to the invertible deformation is formed in the mouth portion of the container.

A thirteenth aspect of the present invention provides a blow molding device that stretches and blows a preform in a metal mold by means of a content fluid so as to form a container, wherein the metal mold includes a body section metal mold and a bottom section metal mold, and after the blowing is completed, head space is formed by driving the bottom section metal mold in a direction in which the bottom section metal mold is pulled out in a state where the body section metal mold is closed in order to invert a bulging shape of a bottom portion of the container and by introducing air to an inside of the container.

In the blow molding device with the above structure, the blow molding method according to the eighth aspect is favorably performed.

A fourteenth aspect of the present invention provides the blow molding device according to the thirteenth aspect, wherein the bottom section metal mold includes a locking portion configured to be locked into a middle portion of the bottom portion of the container that faces the bottom section metal mold, and the head space is formed by driving the bottom section metal mold from the bottom portion of the container in the direction in which the bottom section metal mold is pulled out in a state where the locking portion included in the bottom section metal mold is locked into the middle portion of the bottom portion of the container in order to invert the bulging shape of the bottom portion of the container toward an outside of the container and by introducing the air to the inside of the container.

In the blow molding device with the above structure, the blow molding method according to the ninth aspect is favorably performed.

A fifteenth aspect of the present invention provides the blow molding device according to the fourteenth aspect, wherein the locking portion included in the bottom section metal mold is formed in a convex shape whose diameter increases toward a tip thereof.

In the blow molding device with the above structure, the blow molding method according to the tenth aspect is favorably performed.

A sixteenth aspect of the present invention provides the blow molding device according to the thirteenth aspect, wherein the bottom section metal mold includes a rod-shaped first metal mold and a ring-shaped second metal mold surrounding the first metal mold, the first metal mold including a tip portion formed in a convex shape whose diameter increases toward a tip thereof, and the head space is formed by driving the bottom section metal mold in the direction in which the bottom section metal mold is pulled out in order to invert the bulging shape of the bottom portion of the container toward an outside of the container and by introducing the air to the inside of the container.

In the blow molding device with the above structure, the blow molding method according to the eleventh aspect is favorably performed.

A seventeenth aspect of the present invention provides the blow molding device according to the thirteenth aspect, wherein the bottom section metal mold includes a rod-shaped first metal mold and a ring-shaped second metal mold surrounding the first metal mold, and after the blowing is completed, the head space is formed by projecting the first metal mold relative to the second metal mold in order to invert the bulging shape of the bottom portion of the container toward the inside of the container and then driving the first metal mold in a direction in which the first metal mold is pulled out in order to invert the bulging shape of the bottom portion of the container and by introducing the air to the inside of the container.

In the blow molding device with the above structure, the blow molding method according to the twelfth aspect is favorably performed.

Advantageous Effects of Invention

According to the method for manufacturing a container containing a content fluid of the present invention, shrinkage and deformation of a bottle over a passage of time after the sealing step are prevented.

According to the method for placing an inside of a container under a positive pressure of the present invention, since the method utilizes a blow molding method using a content fluid to be filled in the container as the pressure medium, the content fluid may be filled at the time of molding of the container. Furthermore, by sealing a mouth portion of the container in a state where the content fluid is filled after the molding, in particular, immediately after the molding, the inside of the container is placed under the positive pressure due to reduction in volume of the container resulting from after-shrinkage of a circumferential wall of the container after the molding subsequent to the sealing, without using an additional measure such as adding a drip of liquid nitrogen and without compromising productivity compared with a conventional blow molding method using a liquid as the pressure medium.

According to the blow molding device and the blow molding method using the blow molding device according to the present invention, a predetermined volume of head space is formed in a container obtained by blowing a preform in a metal mold with use of a content fluid. As a result, until the step of capping a mouth portion of the container after blow molding, leakage of the content fluid is favorably prevented. Furthermore, since a bottom portion of the container has a shape bulging toward the outside of the container, when pressure in the inside of the container is decreased after the capping, the shape of the bottom portion is restored. As a result, irregular deformation due to the decreased pressure is favorably prevented.

DESCRIPTION OF EMBODIMENTS

First Embodiment

A method for manufacturing a container (which may also be referred to below as a bottle) containing a content fluid according to A first embodiment of the present invention is described below with reference to FIGS. 1-4.

In the method for manufacturing a bottle containing a content fluid according to the present embodiment, the molding step and the sealing step are performed. In the molding step, a bottomed tubular preform that is heated to a temperature at which the preform is stretchable is stretched so as to form the bottle by means of pressure of the content fluid injected into the preform through a mouth portion of the preform. In the sealing step, the content fluid is sealed by fitting a cap body to the mouth portion. In the molding step, an invertible deforming portion is also formed in the bottle. The invertible deforming portion is freely invertible and deformable toward an inside of the bottle. After the sealing step before a temperature of the bottle decreases to a room temperature, the pressurizing step is also performed. In the pressurizing step, an inner pressure of the bottle is increased by reducing a volume of the bottle by inverting and deforming the invertible deforming portion toward the inside of the bottle.

In the following, the above steps are described in detail.

(Molding Step)

Figure 1:
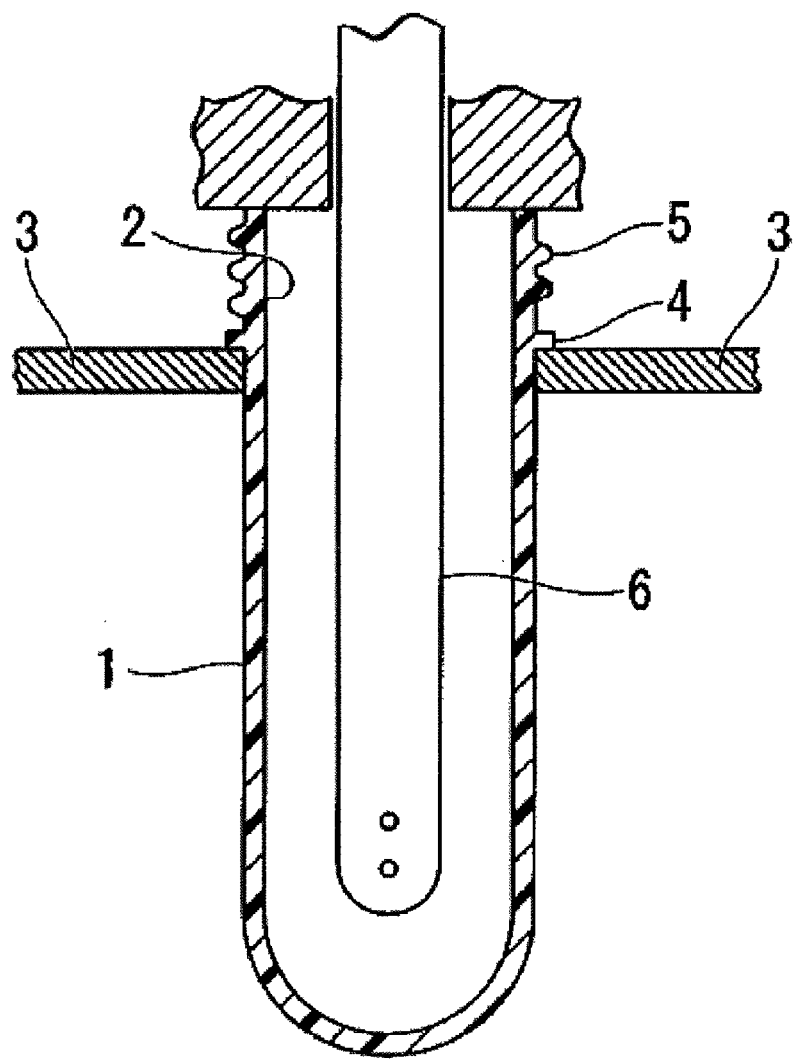
FIG. 1 is a longitudinal sectional view of a preform used in a method for manufacturing a container containing a content fluid according to A first embodiment of the present invention.

To start with, in the molding step, as illustrated in FIG. 1, a bottomed tubular preform 1 is set in a molding metal mold in a state where the preform 1 is heated to a temperature at which the preform 1 is stretchable. In the description below, in the state where the preform 1 is set in the molding metal mold, a side on which a mouth portion 2 of the preform 1 is located is referred to as upward, and a side on which a bottom portion of the preform 1 is located is referred to as downward.

The molding metal mold is provided with a support portion 3 configured to support, from below, an annular neck ring 4 protruding from an outer circumferential surface of the mouth portion 2 of the preform 1 and to hold the preform 1 to be suspended in the metal mold. The outer circumferential surface of the mouth portion 2 of the preform 1 is provided, on a portion thereof located above the neck ring 4, a male screw portion 5.

In the molding step, an ejection nozzle 6 is inserted downward into the preform 1 through the mouth portion 2, and the content fluid is injected into the preform 1 from the ejection nozzle 6. Then, by means of pressure of the content fluid injected from the ejection nozzle 6, the preform 1 is biaxially stretched.

The ejection nozzle 6 may be changed to a stretching rod, and the biaxial stretching may be performed by stretching in an upward-downward direction by means of the stretching rod and by stretching by means of pressure of the content fluid. Furthermore, the ejection nozzle may be used as the stretching rod.

Figure 2:
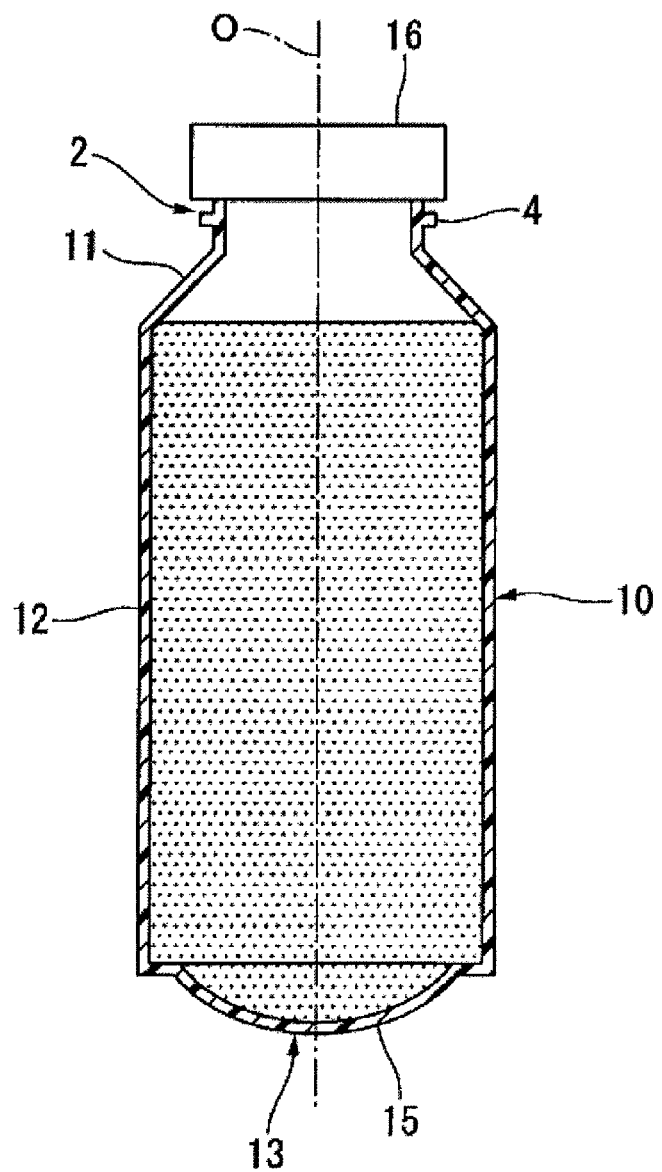
FIG. 2 is a longitudinal sectional view of a container formed by the method for manufacturing a container containing a content fluid according to the first embodiment of the present invention.

FIG. 2 illustrates a bottle 10 formed in the molding step. The bottle 10 contains therein the content injected from the ejection nozzle 6. In FIG. 2, reference sign O indicates an axis line passing a middle of a cross section of the bottle 10. Below, a direction perpendicular to the axis line O is referred to as a radial direction, and a circumferential direction around the axis line O is referred to as a circumferential direction.

The bottle 10 includes the mouth portion 2, a shoulder portion 11 that is connected to a lower end of the mouth portion 2 and that has a diameter increasing toward a bottom of the shoulder portion 11, a body portion 12 that is connected to the shoulder portion 11 and that extends downward, and a bottom portion 13 that closes a lower end opening of the body portion 12. In the present embodiment, at least the body portion 12 is formed in a cylindrical shape.

The bottom portion 13 is provided with an invertible deforming portion 15 that is freely invertible and deformable toward the inside of the bottle 10. The invertible deforming portion 15 is formed in the form of a downwardly protruding curved surface.

(Sealing Step)

Next, in the sealing step, as illustrated in FIG. 2, a cap body (a screw cap) 16 is screwed onto the male screw portion 5 of the mouth portion 2 for sealing the content in the bottle 10. It is also possible to fit a plugging cap adapted for a recess-projection (undercut) fitting to the mouth portion 2, instead of the screw cap.

(Pressurizing Step)

Figure 3:
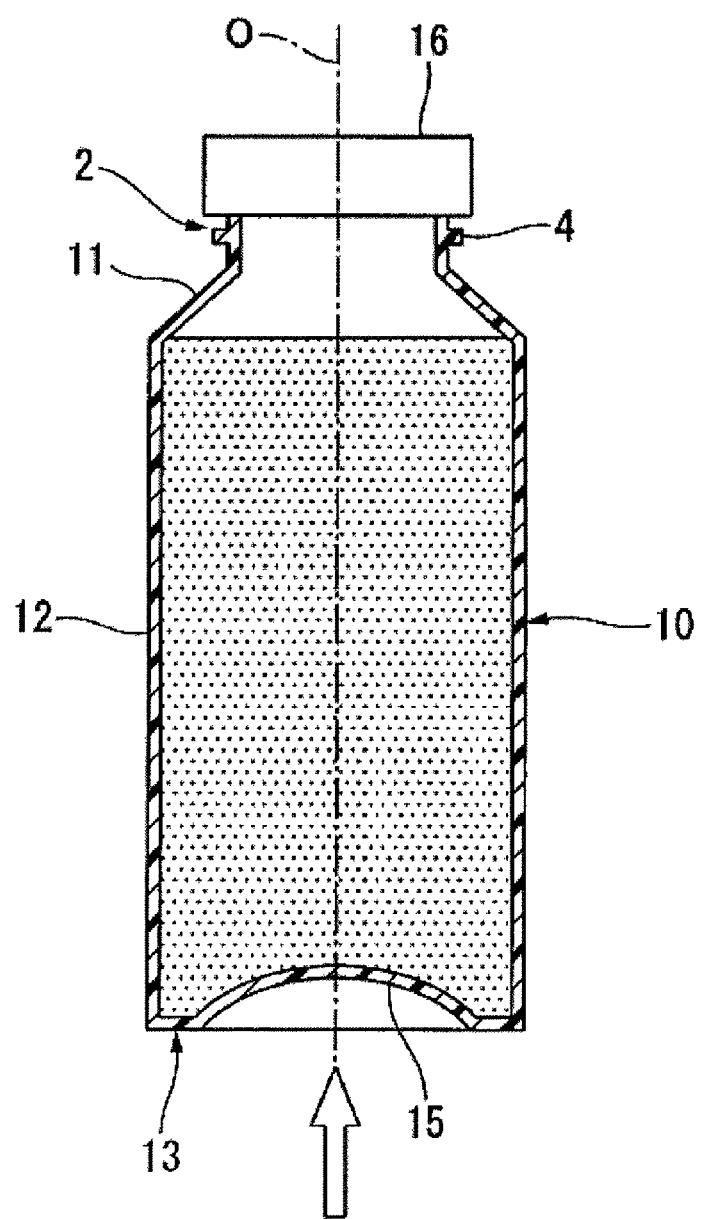
FIG. 3 is a longitudinal sectional view of the container manufactured by the method for manufacturing a container containing a content fluid according to the first embodiment of the present invention, in a state where an invertible deforming portion is deformed.

In the pressurizing step performed after the sealing step, before the temperature of the bottle 10 decreases to the room temperature, preferably immediately after the sealing step, as illustrated in FIG. 3, the invertible deforming portion 15 is inverted and deformed toward the inside of the bottle 10.

At this time, the body portion 12 remains substantially undeformed, and an inner volume of the bottle 10 is decreased as a result of the invertible deforming portion 15 being inverted and deformed. The invertible deforming portion 15 is inverted and deformed toward the inside the bottle 10 by applying, to the bottle 10, compressive force in the direction of the axis line O.

As a method to deform the invertible deforming portion 15, a pressing machine may be used to apply pressing force. Alternatively, a human hand may also be used. The invertible deforming portion 15 is deformed such that a position of inversion is maintained.

When the volume of the bottle 10 is decreased as described above, the content fluid and air inside the bottle 10 are compressed. Accordingly, the inner pressure of the bottle 10 is increased compared to the state illustrated in FIG. 2.

Figure 4:
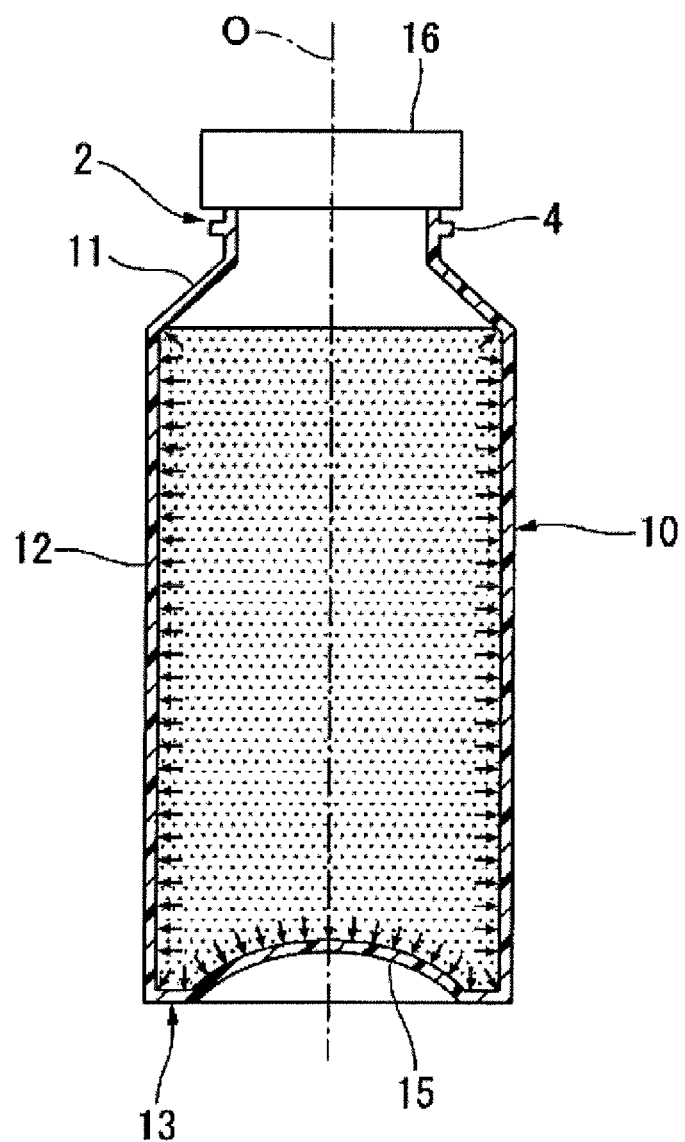
FIG. 4 is a longitudinal sectional view of the container manufactured by the method for manufacturing a container containing a content fluid according to the first embodiment of the present invention, illustrating a state of the container after the invertible deforming portion is deformed.

As a result, as indicated by an arrow directed from the inside to an outside of the bottle 10 in FIG. 4, the content fluid and air inside the bottle 10 applies, from the inside to the outside of the bottle 10, a pressure corresponding to a pressure differential between the inner pressure and an atmospheric pressure outside the bottle 10.

Owing to the above pressure that the content fluid and air within the bottle 10 apply, shrinkage and deformation of the entire bottle 10 is prevented. Furthermore, since the invertible deforming portion 15 is deformed such that the position of inversion is maintained, shrinkage and deformation of the entire bottle 10 is prevented. In the present embodiment, particularly, the invertible deforming portion 15 provided in the bottom portion 13, which is easily influenced by the inner pressure, is deformed such that the position of inversion is maintained. As a result, the bottle 10 is prevented from losing the capability of standing upright.

In the method for manufacturing a container containing a content fluid according to the present embodiment, before the temperature of the bottle 10 decreases to the room temperature, the presence of the pressurizing step increases the inner pressure of the bottle 10 and prevents deformation of the invertible deforming portion 15. Thus, shrinkage and deformation of the bottle 10 over a passage of time after the sealing step are prevented.

Although in the above embodiment the invertible deforming portion 15 is provided in the bottom portion, the invertible deforming portion 15 may be formed in the shoulder portion. Furthermore, the number and shape of the invertible deforming portion 15 are not particularly limited.

Second Embodiment

Next, with reference to FIGS. 5-9, a description is given of a method for placing an inside of a container under a positive pressure according to a second embodiment.

Figure 5:
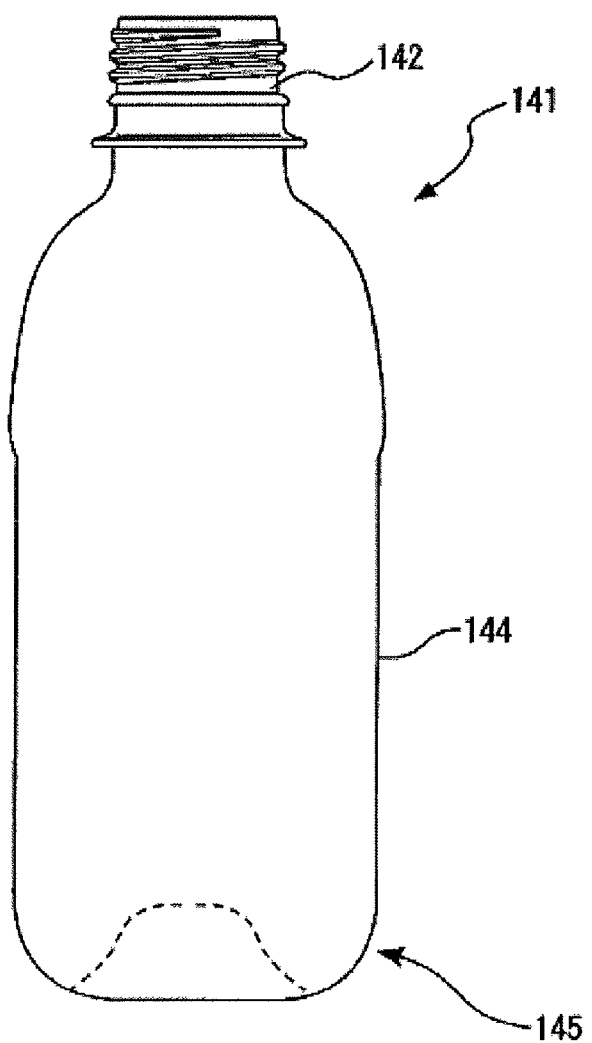
FIG. 5 is a front view illustrating one example of a container according to a second embodiment of the present invention.

FIG. 5 is a front view illustrating one example of a blow molded container in the method for placing the inside of the container under the positive pressure according to the present embodiment.

The container 141 includes a mouth portion 142, a body portion 144 that is connected to a lower end of the mouth portion 142 and that extends downward, and a bottom portion 145 that closes a lower end opening of the body portion 144. The container 141 is made of a propylene-ethylene random copolymer resin (J246M manufactured by Prime Polymer Co., Ltd.), which is a PP-based resin, and is a bottle having a diameter of 73.5 mm, a nominal volume of 360 ml, and weight of 5 g.

Figure 6:
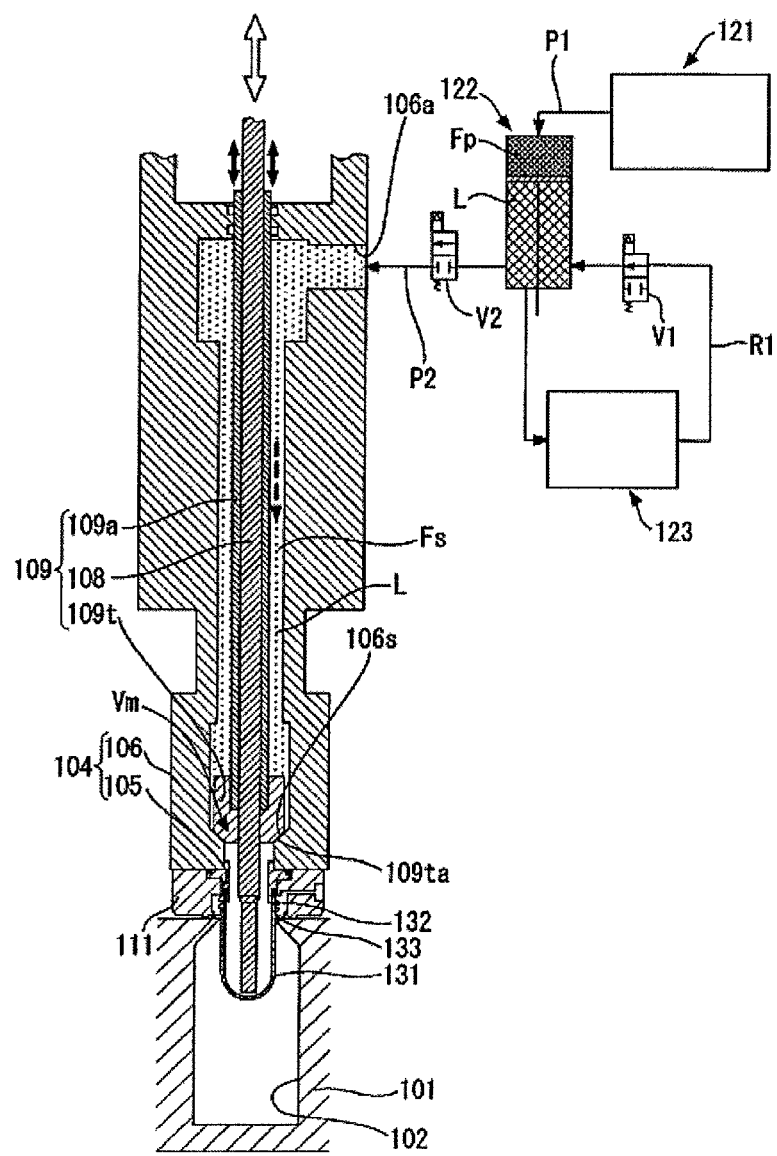
FIG. 6 is a schematic view illustrating a blow molding device using a liquid as a pressure medium according to the second embodiment of the present invention.

FIG. 6 is a schematic view illustrating a blow molding device used for the method for placing the inside of the container under the positive pressure according to the present embodiment. The blow molding device uses a liquid as the pressure medium. FIG. 6 illustrates a state where a preform 131 is fitted to a metal mold 101 and where a tip of a blow nozzle 104 is engaged into a mouth portion 132 of the preform 131. The entire shape of the preform 131 used has a bottomed cylindrical test tube shape. The preform 131 includes the mouth portion 132 in an upper end portion thereof. The mouth portion 132 is provided, in a lower end portion thereof, with a neck ring 133. The preform 131 is fitted in the metal mold 101, with the mouth portion 132 being projected to the outside (upward in FIG. 6).

A part of the device includes the metal mold 101, a partition wall member 11, and the blow nozzle 104 and also includes, as auxiliary equipment, a pressurizing device 121, a pressurized liquid supply unit 122, and a liquid supply unit 123.

As illustrated in FIG. 6, the partition wall member 111 is provided above the metal mold 101 and surrounds an outer circumferential surface of the mouth portion 132 of the preform 131 projected upward of the metal mold 101 via space. The partition wall member 111 also includes a lower end portion configured to tightly abut against the neck ring 133 of the preform 131 from above so as to maintain a fitted position of the preform 131.

The entire blow nozzle 104 has a tubular shape and includes an engaging tubular piece 105 and a supply tubular portion 106. A cylindrical tip portion of the engaging tubular piece 105 is engaged into the mouth portion 132 of the preform 131, and the blow nozzle 104 and the mouth portion 132 are brought into tight communication.

The entire supply tubular portion 106 is a member including a cylindrical hollow portion inside thereof. The supply tubular portion 106 is provided, in an upper end portion thereof, with an introduction path 106a for a liquid L such that the introduction path 106a extends through the circumferential wall. On an inner circumferential surface of the lower end portion of the supply tubular portion 106, an inclined seal stepped portion 106s whose diameter is decreased downward is circumferentially provided.

In the blow nozzle 104 including the engaging tubular piece 105 and the introduction tubular portion 106, a seal body 109 in the form of a slim rod that is long in an axis direction (in an upward-downward direction in FIG. 6) is inserted and disposed.

The seal body 109 includes a shaft body 109a that is in the form of a narrow and long cylindrical rod and an elongate cylindrical rod 108 that is inserted through the shaft body 109a such that the rod 108 is slidable in a liquid-tight manner. The shaft body 109a has a tip portion to which a seal tubular piece 109t having a short cylindrical shape is coaxially engaged and assembled. In a lower end surface of the seal tubular piece 109t, an outer circumferential edge portion is removed to form a tapered edge portion 109ta.

By means of the blow nozzle 104 and the seal body 109, a cylindrical supply path Fs is formed in the blow nozzle 104 along the axial direction of the blow nozzle 104. The supply path Fs communicates with the inside of the preform 131. By displacing the seal body 109 downward, as illustrated in FIG. 6, the tapered edge portion 109ta formed in the seal tubular piece 109t comes into abutment with the seal stepped portion 106s circumferentially provided around the inner circumferential surface of the lower end portion of the supply tubular portion 106, thereby placing the communication of the supply path Fs to the inside of the preform 131 into a closed state. By displacing the seal body 109 upward, the communication of the supply path Fs to the inside of the preform 131 is placed into an open state. Thus, a valve mechanism Vm is configured by bringing and releasing the tapered edge portion 109ta into and from the abutment against the seal stepped portion 106s.

The rod 108 serves to regulate head space HS in the container 141 to be a predetermined volume. The container 141 is, as described below, filled with the liquid L, which is used as the pressurized liquid during blow molding, as a product at the time of shaping.

The rod 108 may also be used as a stretching rod for vertically stretching the preform 131.

Next, the auxiliary equipment is described. The auxiliary equipment includes the pressurizing device 121, the pressurized liquid supply unit 122, and the liquid supply unit 123. The pressurized liquid Fp supplied from the pressurizing device 121 through a pipe P1 serves as a power source for driving the pressurized liquid supply unit 122 in the form of a plunger pump configured to supply the pressurized liquid L.

The liquid supply unit 123 supplies, to the pressurized liquid supply unit 122 through a pipe R1 and an electromagnetic valve V1, the liquid L that is regulated to be a predetermined temperature.

After pressurized by the pressurized liquid supply unit 122, the pressurized liquid L is supplied to the inside of a preform 131 that is externally fitted to a tip portion of the blow nozzle 104 tightly, through a pipe P2, an electromagnetic valve V2, and the blow nozzle 104.

Figure 7A:
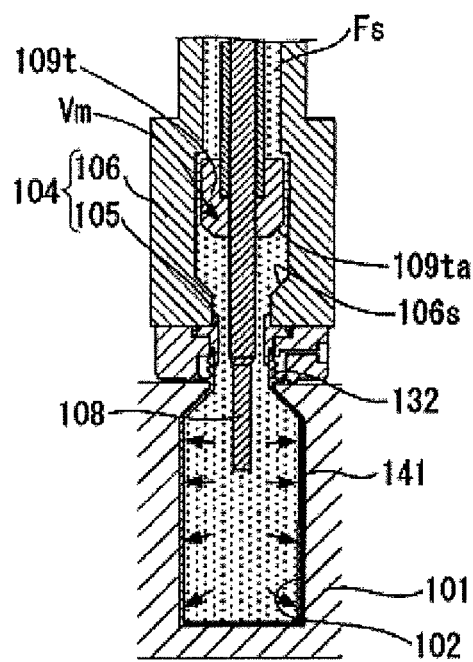
FIG. 7A is a schematic view illustrating a step in a method for positive pressurization according to the second embodiment of the present invention.
Figure 7B:
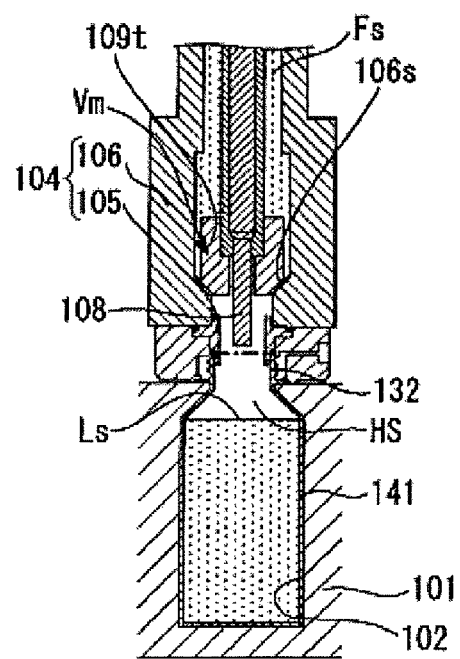
FIG. 7B is a schematic view illustrating a step in the method for positive pressurization according to the second embodiment of the present invention.
Figure 7C:
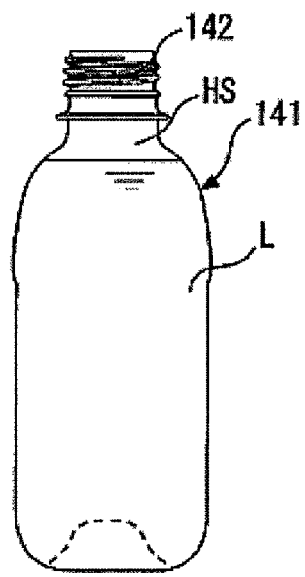
FIG. 7C is a schematic view illustrating a step in the method for positive pressurization according to the second embodiment of the present invention.
Figure 7D:
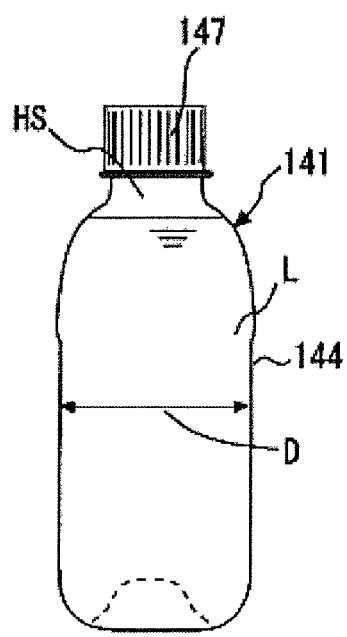
FIG. 7D is a schematic view illustrating a step in the method for positive pressurization according to the second embodiment of the present invention.

Next, FIGS. 7A-7D are schematic views each illustrating one example of the method for positive pressurization according to the present embodiment. In the method for positive pressurization according to the present embodiment, the steps described in (1)-(4) below are performed in sequence. FIG. 7D illustrates a filled container according to the embodiment of the present invention.

(1) To start with, as illustrated in FIG. 6, the preform 131 which, except for the mouth portion 132, is heated to a temperature suitable for blow molding is fitted to the metal mold 101 used for blow molding, with the mouth portion 132 being projected upward, and the tip portion of the fitting tubular piece 105 is engaged into the mouth portion 132.

At this time, the tapered edge portion 109ta of the seal tubular piece 109t that constitutes the tip portion of the seal body 109 is abutted against the seal stepped portion 106s provided in the supply tubular portion 106 so that the valve mechanism Vm is in the closed state, and the rod 108 is displaced downward so that the tip portion of the rod 108 is inserted in the preform 131 by a predetermined length. Furthermore, at this time, the valve V1 is in the open state, and the valve V2 is in the closed state.

(2) Subsequently, as illustrated in the states from FIG. 6 to FIG. 7A, the seal tubular piece 109t is displaced upward in conjunction with the shaft body 109a constituting the seal body 109 so that the valve mechanism Vm is switched to the open state. The valve V1 is switched to the closed state, and the valve V2 is switched to the open state. In FIGS. 7A and 7B, the valve V1 and the valve V2 are not illustrated. In the above circumstance, the pressurized liquid L is supplied from the pressurized liquid supply unit 122 to the inside of the preform 131 through the supply path Fs and the mouth portion 132. By doing so, the preform 131 is inflated and stretched, and the container 141 is shaped in accordance with the cavity 102 of the metal mold 101.

(3) Subsequently, after the container 141 is shaped as described above, as illustrated in FIG. 7B, the shaft body 109a and the seal tubular piece 109t are displaced downward so as to place the valve mechanism Vm into the closed state. Furthermore, the valve V1 is switched to the open state, and the valve V2 is switched to the closed state. In the above circumstance, the tip portion of the rod 108 is disinserted from the container 141.

In conjunction with the disinsertion of the rod 108, all the liquid L remaining in a portion of the supply path Fs below the valve mechanism Vm is flowed into the container 141, and the liquid surface Ls is lowered in the container 141. As a result, the head space HS is regulated to be the predetermined volume set in advance.

(4) Immediately after the container 141 filled with the liquid L illustrated in FIG. 7C is removed from the metal mold 101, the mouth portion 142 is sealed by a cap 147 as illustrated in FIG. 7D. Thus, the filled container is completed.

Subsequently, the buckling strength of the filled container manufactured by the above method for positive pressurization was measured. Specifically, filled containers according to examples 1, 2, and 3 were manufactured by using water as the liquid L, conducting blow molding in accordance with the method for positive pressurization described above, and performing sealing with the cap 147 immediately after the molding. For each of the filled containers according to the examples 1, 2, and 3, transition in pressure (kPa) within the container 141 due to an elapse of time after the sealing with the cap 147 was measured. The buckling strength was also measured after 24 hours elapsed.

Conditions of molding of the examples 1-3 are as follows.

Example 1

The temperature of the liquid L 20° C., the temperature of the metal mold 20° C.

Example 2

The temperature of the liquid L 20° C., the temperature of the metal mold 80° C.

Example 3

The temperature of the liquid L 70° C., the temperature of the metal mold 20° C.

In the blow molding of each of the containers 141 according to the examples 1, 2, and 3, a preheat temperature of the preform was set to be 120-150° C. In FIG. 7B, a filling pressure of the liquid L was 4 MPa, and the volume of the head space HS was 10 ml.

Furthermore, for the example 1, a shrinkage rate of a diameter D (refer to FIG. 7D) of the body portion 144, along with the pressure, was also measured over the elapse of time.

The measurement of the pressure inside the container 141 and the buckling strength was conducted at the room temperature 23° C., and the following measurement methods were used.

<Measurement Method of the Pressure Inside the Container>

A rubber plug providing a sealing function was fitted over the cap 147, and a pressure sensor was inserted into the container 141 through the rubber plug such that the pressure sensor penetrated a top wall of the cap 147. Then, the pressure inside the container 141 was measured.

<Measurement Method of the Buckling Strength>

After 24 hours elapsed from the manufacturing of the filled container, a Shimazu Autograph AGS-X was used to compress the container 141 sealed with the cap 147 along a center axis of the container 141 at a speed of 50 mm/minute. The load measured when the container 141 underwent buckling deformation was set to be the buckling strength.

Figure 8:
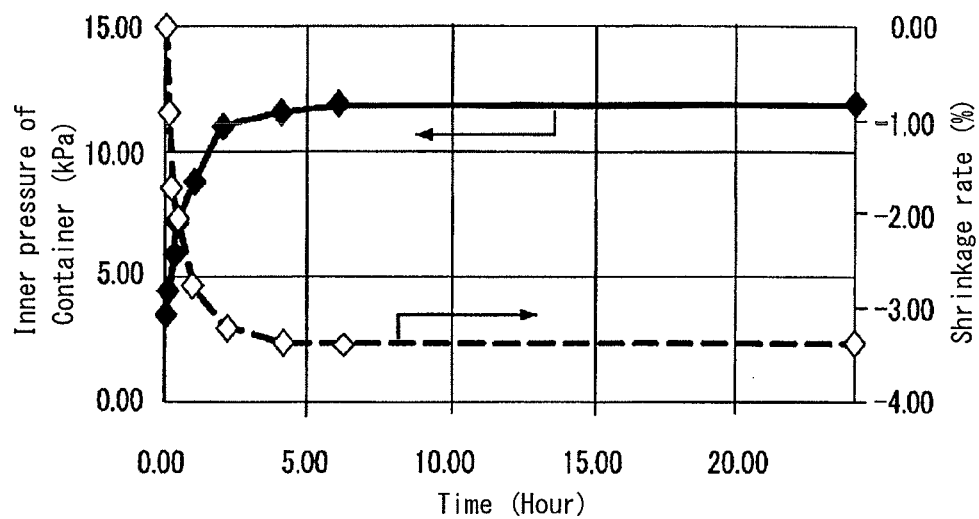
FIG. 8 is a graph indicating, for a filled container according to an example 1, transition of a shrinkage rate and pressure inside the container due to an elapse of time.

FIG. 8 is a graph illustrating measurement results of the filled container according to the example 1, with a horizontal axis representing time and a vertical axis representing the shrinkage rate (%) and the pressure (kPa). In the graph of FIG. 8, a solid line represents the pressure inside the container, and a dash line represents the shrinkage rate. The pressure inside the container is indicated by a difference with the atmospheric pressure. The shrinkage rate (%) was calculated from the diameter D immediately after the sealing with the cap 147 was performed and from the diameter $D_t$ after a time period T elapsed, in accordance with the following formula.

$$(D_t-D)/D \times 100 \qquad [\text{Formula 1}]$$

As can be seen from the graph, the diameter D of the body portion 144 is rapidly shrunk first, and then, in approximately 6 hours, the shrinkage is saturated at approximately −3.4%.

On the other hand, the pressure inside the container is first rapidly increased in correspondence with the above shrinkage behavior of the diameter D, and then, in approximately 6 hours, the pressure is substantially saturated at approximately 12 kPa. That is to say, it was confirmed that, due to after-shrinkage of the container 141 after the container 141 was molded, the inside of the container was placed under the positive pressure.

Figure 9:
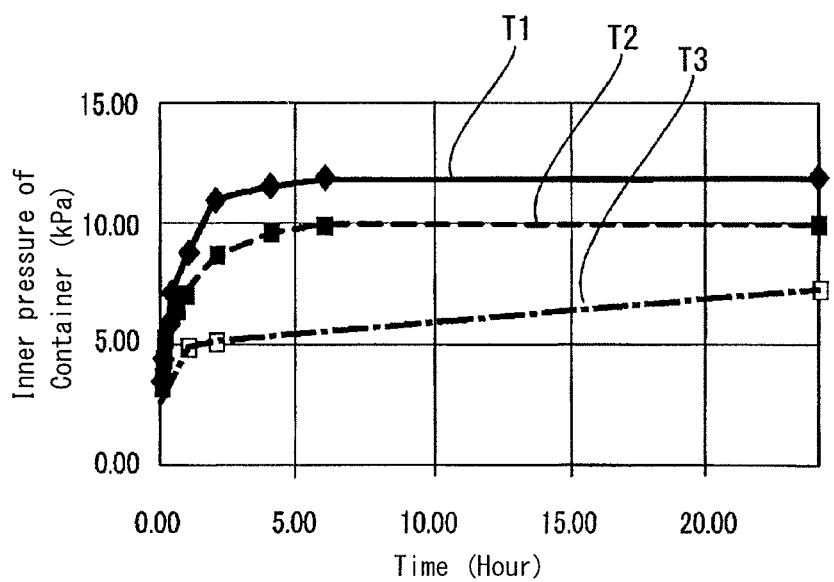
FIG. 9 is a graph indicating, for a filled container according to each of examples 1-3, transition of pressure inside the container due to an elapse of time.
Figure 10:
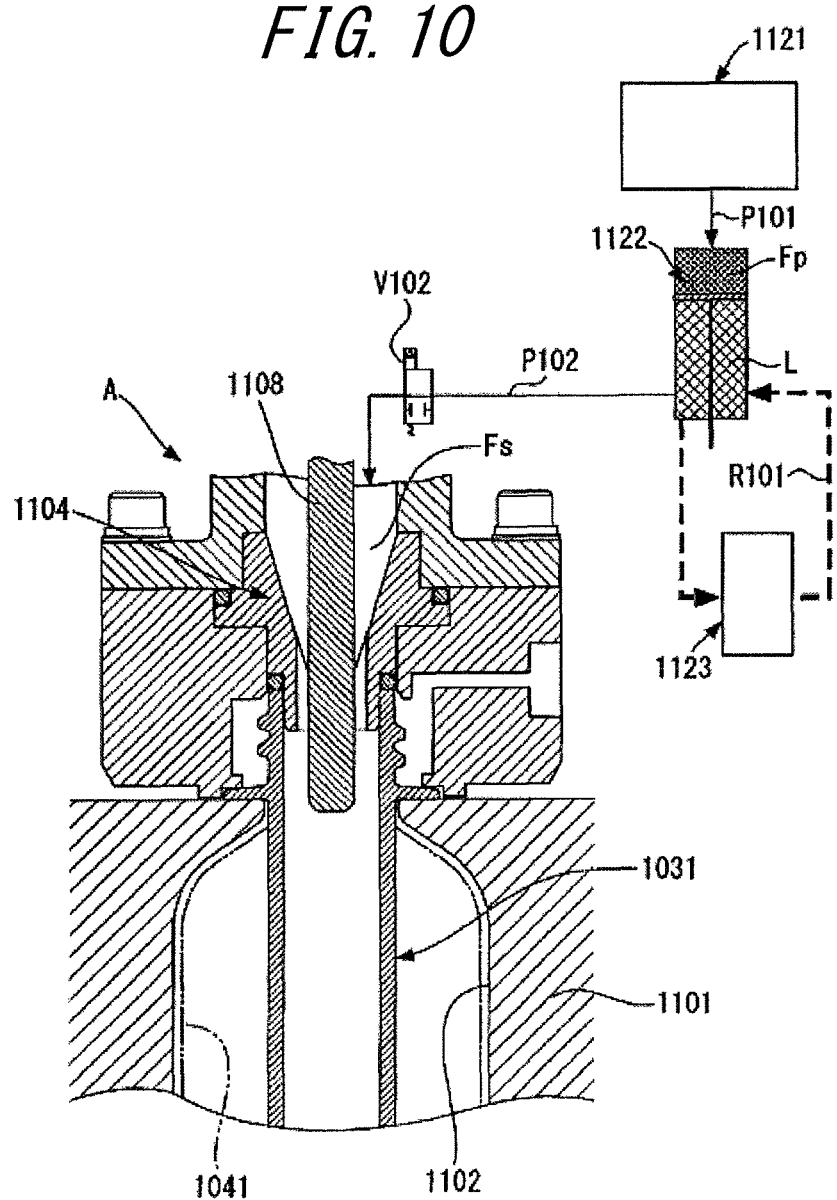
FIG. 10 is a schematic view illustrating a conventional blow molding device using a liquid as a pressure medium.

In FIG. 9, changes in pressure inside the containers 141 according to the examples 1, 2, and 3 are compared. The changes in pressure in the example 1 are indicated by a solid line T1, the changes in pressure in the example 2 are indicated by a dash line T2, and the changes in pressure in the example 3 are indicated by an alternate long and short dash line T3.

In comparison between T1 and T2, when the temperature of the liquid L is 20° C. and when the temperature of the metal mold is increased from 20° C. to 80° C., the inner pressure is slightly decreased, and the pressure of the container 141 in the saturated state is decreased from 12 kPa to 9.7 kPa, approximately. The reason is probably that, due to the increase in the temperature of the metal mold in manufacturing of the PP-based resin container, the container is cooled and solidified in the metal mold in a state where crystallization of the PP-based resin further progresses, and therefore, after-shrinkage of the container is limited, and correspondingly, the magnitude of the positive pressure is decreased.

On the other hand, in comparison between T1 and T3, when the temperature of the metal mold is 20° C. and when the temperature of the liquid L is increased from 20° C. to 70° C., the pressure inside the container 141 in the saturated state is decreased from 12 kPa to 7.3 kPa, approximately. The reason is probably that the increase in the temperature of the liquid L causes a pressure reduction effect attributed to a decrease in temperature after the sealing, and correspondingly, the magnitude of the positive pressure due to after-shrinkage of the container 141 is decreased.

From the measurement results of the pressure inside the container 141 as indicated by T1, T2, and T3, it has been found that the magnitude of the positive pressure may be regulated according to the temperature of the liquid L and the temperature of the metal mold that constitute the conditions of blow molding.

The buckling strength of the filled containers according to the examples 1, 2, and 3 were 68.5 (N), 59.3 (N), and 50.6 (N), respectively. The magnitude of the buckling strength corresponds to the magnitude of the positive pressure.

Furthermore, a filled container according to a comparative example was manufactured by leaving the filled container according to the example 1, which the container is filled with the liquid L after being molded, for 24 hours without sealing the filled container with the cap 147, and by subsequently sealing the filled container with the cap 147. The buckling strength measured similarly for the filled container according to the comparative example was 44.6 (N). From the positive pressurization in the examples 1, 2, and 3 described above, it has been confirmed that the buckling strength of the container filled with the liquid L may be increased according to the magnitude of the positive pressure.

Although the method for placing the inside of the container according to the present invention has been described in accordance with the embodiment, the present invention is not limited to the above embodiment.

The blow molding device of FIG. 6 is intended for illustration of the present invention only. For example, the rod 108 may be used as a stretching rod for vertically stretching the preform 131, and biaxial stretch blow molding combining the vertical stretching by means of the rod 108 with the inflation and stretching by means of the pressurized liquid L may be performed.

Furthermore, in the device of FIG. 6, the seal body 109 is provided to open and close the supply path Fs of the liquid L that leads into the preform. However, the opening/closing mechanism may be selected from among a variety of opening/closing configurations in consideration of productivity, precision of the volume of the head space, or the like.

Moreover, in order to keep the temperature of the liquid L to be constant, auxiliary equipment, such as a liquid circulation device configured to circulate the liquid L retained in the supply path Fs included in the blow nozzle 104, may be additionally provided as needed.

Although in the above embodiment the example of molding the PP-based resin container is described, a PET resin, with its excellent moldability with respect to biaxial stretch blow molding and sufficient after-shrinkage characteristics, is another example of the synthetic resin suitably used in the method for positive pressurization according to the present invention.

In addition to the PP-based resin and the PET resin, any synthetic resin that is conventionally used for biaxial stretch blow molding, such as a polyethylenenaphthalate (PEN) resin and a polylactic acid (PLA) resin, may also be used as the synthetic resin suited for the method for positive pressurization according to the present invention.

Moreover, the temperature of the liquid L may be appropriately determined in consideration of, for example, a temperature required for the filled container for the sake of sterilization.

The temperature of the metal mold may also be appropriately determined in consideration of a required magnitude of after-shrinkage, productivity, surface gloss, or the like.

The magnitude of the positive pressure may be determined by regulating a plurality of requirements such as the synthetic resin used, the temperature of the liquid used, the temperature of the metal mold used for blow molding, vertical and horizontal stretching ratio during blow molding, the volume of the head space in the filled container.

Among the above requirements, the magnitude of after-shrinkage may be regulated by the synthetic resin used and the conditions of blow molding. Generally, after-shrinkage of a container quickly progresses immediately after molding and subsequently, after-shrinkage is saturated at a constant magnitude after a long period of time. Accordingly, in order to take the most advantage of after-shrinkage of the container for positive pressurization, it is preferable to seal the mouth portion immediately after blow molding.

Furthermore, the increase in the temperature of the liquid used leads to the decrease in the pressure inside the container due to the temperature decrease after the sealing, and correspondingly, the positive pressurization effect due to after-shrinkage of the container is deteriorated. Accordingly, from the viewpoint of increasing the magnitude of the positive pressure, the temperature of the liquid is preferably as low as possible.

On the other hand, it is also necessary to consider the need for sterilization by filling of a high-temperature liquid, as well as blow moldability. Accordingly, the temperature of the liquid needs to be determined in consideration of the above factors along with the required magnitude of the positive pressure.

The magnitude of the positive pressure may also be regulated by setting of the temperature of the liquid and the temperature of the metal mold used for blow molding.

As described above, the magnitude of the positive pressure is determined by several requirements. For example, even when the requirements such as the shape of the container, the synthetic resin used, the volume of head space are restricted, the temperature of the liquid and the temperature of the metal mold used for blow molding may be arbitrarily modified within a certain permissible range. Accordingly, by changing the temperature of the liquid and the temperature of the metal mold used for blow molding, the magnitude of the positive pressure may be controlled.

In addition, in case of a synthetic resin, in particular, a crystalline synthetic resin, the temperature of the metal mold may be set to be relatively low. In the above case, molding is completed while progress of crystallization is not sufficient, and the subsequent progress of crystallization due to an elapse of time increases after-shrinkage.

The container may be made of a polypropylene (PP)-based resin. The PP-based resin may be molded by biaxial stretch blow molding, and a molded article of the PP-based resin has relatively large after-shrinkage after molding which progresses over a long period of time. Accordingly, the positive pressurization due to the reduction in volume is achieved sufficiently and easily.

Although the PP-based resin used in the present embodiment is not particularly limited, in consideration of shrinkage characteristics, a crystalline polypropylene-based resin is preferable. Examples of the polypropylene-based resin that may be preferably used include a crystalline block copolymer of: a crystalline propylene homopolymer, a crystalline propylene-ethylene random copolymer, a crystalline propylene-α-olefin random copolymer, and propylene; and ethylene and/or α-olefin. As α-olefin, the α-olefin having a carbon number of 4-10, such as butene-1, pentene-1, hexene-1, octene-1, and decene-1, may be used.

The container may be made of a polyethylene terephthalate (PET) resin. The PET resin has excellent moldability with respect to biaxial stretch blow molding. Accordingly, owing to the after-shrinkage of the container after molding that is caused by stretch crystallization, the positive pressurization due to the reduction in volume is achieved sufficiently and easily.

With reference to FIGS. 11-19, a description is given below of a blow molding device and a blow molding method according to an embodiment of the present invention.

Third Embodiment

Figure 11:
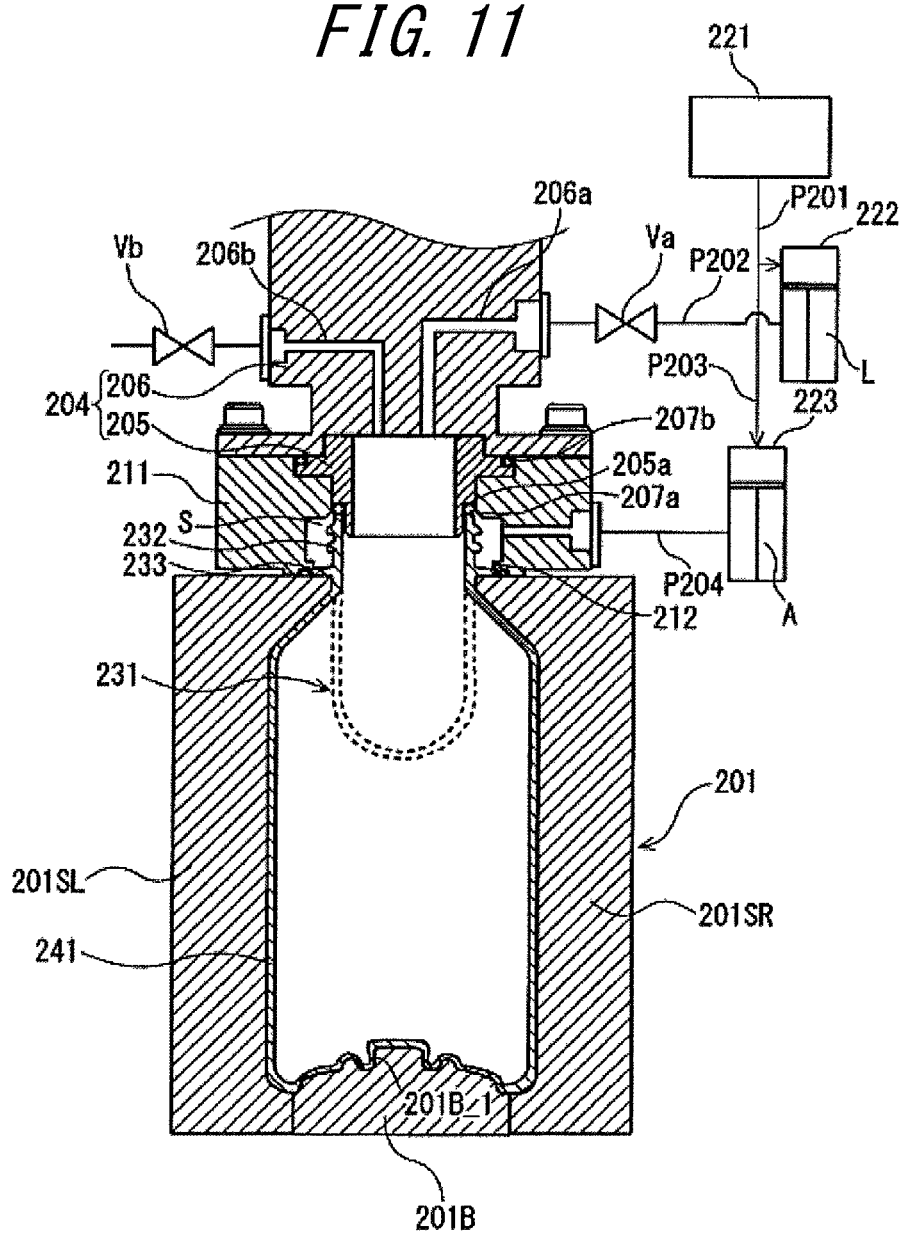
FIG. 11 is a schematic view illustrating an overall structure of a blow molding device according to a third embodiment of the present invention.

FIG. 11 is a schematic view illustrating an overall structure of a blow molding device according to a third embodiment of the present invention. In FIG. 11, a preform 231 fitted in a metal mold 201 is indicated by a dotted line, and a bottle container 241 molded from the preform 231 is indicated by a solid line.

The entire shape of the preform 231 used has a bottomed cylindrical test tube shape. The preform 231 includes a mouth tubular portion (which is also referred to as a mouth portion) 232 in an upper end portion thereof. The mouth tubular portion 232 is provided, in a lower end portion thereof, with a neck ring 233. The preform 231 is fitted in the metal mold 201, with the mouth tubular portion 232 being projected to the outside (upward in FIG. 11).

A part of the device includes the metal mold 201, a partition wall member 211, and a blow nozzle 204 and also includes, as auxiliary equipment, a pressurizing device 221, a pressurized liquid supply unit 222, and a pressurized air supply unit 223.

The metal mold 201 consists of a pair of body section metal molds 201SR, 201SL for molding a body portion of the container 241 and a bottom section metal mold 201B for molding a bottom portion of the container 241. The bottom section metal mold 201B is provided, in a middle portion thereof, with a clavately convex portion having a tapered surface 201B_1 with an increasing lateral width toward a tip, so that the bottom section metal mold 201B is preferably locked to the bottom portion of the container 241 when being pulled out. That is to say, the convex portion of the bottom section metal mold 201B has a diameter increasing toward the tip of the convex portion, thereby forming a locking portion.

In addition to the above, as far as the illustrated part is concerned, the partition wall member 211 is provided above the metal mold 201, and the partition wall member 211 surrounds an outer circumferential surface of the mouth tubular portion 232 of the preform 231 projected upward of the metal mold 201 via space S. The partition wall member 211 also includes a support flange piece 212 provided around a lower end portion of the partition wall member 211, and the support flange piece 212 tightly abuts against the neck ring 233 of the preform 231 from above so as to maintain a fitted position of the preform 231.

The blow nozzle 204 includes an engaging tubular piece 205 and a guiding tubular portion (which is also referred to as a supply tubular portion) 206 which are tightly coupled by means of a seal member 207b.

The entire engaging tubular portion 205 has a tubular shape and includes a cylindrical hollow portion inside thereof. The engaging tubular piece 205 is provided, on an outer circumferential wall thereof, with a circumferential stepped portion 205a whose diameter is decreased toward a tip thereof. The cylindrical tip portion of the engaging tubular piece 205 is engaged into the mouth tubular portion 232 of the preform 231, and as a result of abutment between the circumferential stepped portion 205a and an upper end surface of the mouth tubular portion 232 via a seal member (an O-ring) 207a, the blow nozzle 204 and the mouth tubular portion 232 are coupled and brought into tight communication.

The guiding tubular portion 206 is formed and provided with a through path 206a serving as a path for supplying the pressurized liquid L such that the through path 206a traverses through a circumferential wall at a predetermined height position. The pressurized liquid L may be supplied or stopped from being supplied to the through path 206a by means of an electromagnetic valve Va.

In a position opposite to the through path 206a, a vent hole 206b is also formed and provided for bringing an outside of the guiding tubular portion 206 into communication with an inside of the guiding tubular portion 206. The communication may be opened or closed by means of an electromagnetic valve Vb. The vent hole 206b is provided, in a portion thereof near the engaging tubular piece 205, a check valve (which is not illustrated) for preventing the pressurized liquid L from entering the vent hole 206b.

Although in the present embodiment the electromagnetic valve Va is provided in the through path 206a and the electromagnetic valve Vb is provided in the vent hole 206b, other types of valves may be, of course, provided.

Next, the auxiliary equipment is described. In the auxiliary equipment, the pressurizing device 221 has been conventionally an indispensable device in blow molding and is a large-sized device such as a pressurizing pump and a compressor.

From the pressurizing device 221, the pressurized fluid (drive fluid) is supplied to the pressurized liquid supply unit 222 through a pipe P201, and the pressurized fluid (drive fluid) is also supplied to the pressurized air supply unit 223 through a pipe P203. The pressurized liquid supply unit 222 supplies the pressurized liquid L used for blow molding. The pressurized air supply unit 223 supplies pressurized air A. The pressurized liquid supply unit 222 and the pressurized air supply unit 223 are of a plunger pump type and utilize, as a power source, the pressurized fluid supplied from the pressurizing device 221. Needless to say, it is also possible to additionally provide, for example, a pressurizing device for the pressurized air supply unit 223 in consideration of the overall layout, ease of control, or the like of the device. Furthermore, as the pressurized liquid supply unit 222 and the pressurized air supply unit 223, in addition to the illustrated plunger pump type, for example, a cylinder type with a built-in piston that includes two compartments may also be used.

The pressurized liquid L supplied from the pressurized liquid supply unit 222 passes through the pipe P202, through the electromagnetic valve Va, and through the through path 206a provided in the guiding tubular portion 206, and the pressurized liquid L is supplied to the inside of the preform 231.

The device illustrated in FIG. 11 includes the pressurized air supply unit 223 that supplies the pressurized air A. However, in a case where the mouth tubular portion 232 undergoes diameter increase and deformation due to pressure of the pressurized liquid L when the pressurized liquid L is supplied to the preform 231, it is possible to introduce the pressurized air A into the partition wall member 11 via a pipe P204 and to pressurize the space S surrounding the outer circumferential surface of the mouth tubular portion 232 of the preform 231. By doing so, the diameter increase and deformation of the mouth tubular portion 232 is effectively prevented.

FIGS. 12-15 sequentially illustrate molding steps in a method for manufacturing a synthetic resin container with use of the device illustrated in FIG. 11 according to an embodiment of the present invention. With reference to FIGS. 12-15, a description is given of the method for manufacturing a synthetic resin container, namely, a blow molding method, according to the embodiment of the present invention.

In blow molding, the steps described in (1)-(5) below are performed in sequence.

Figure 12:
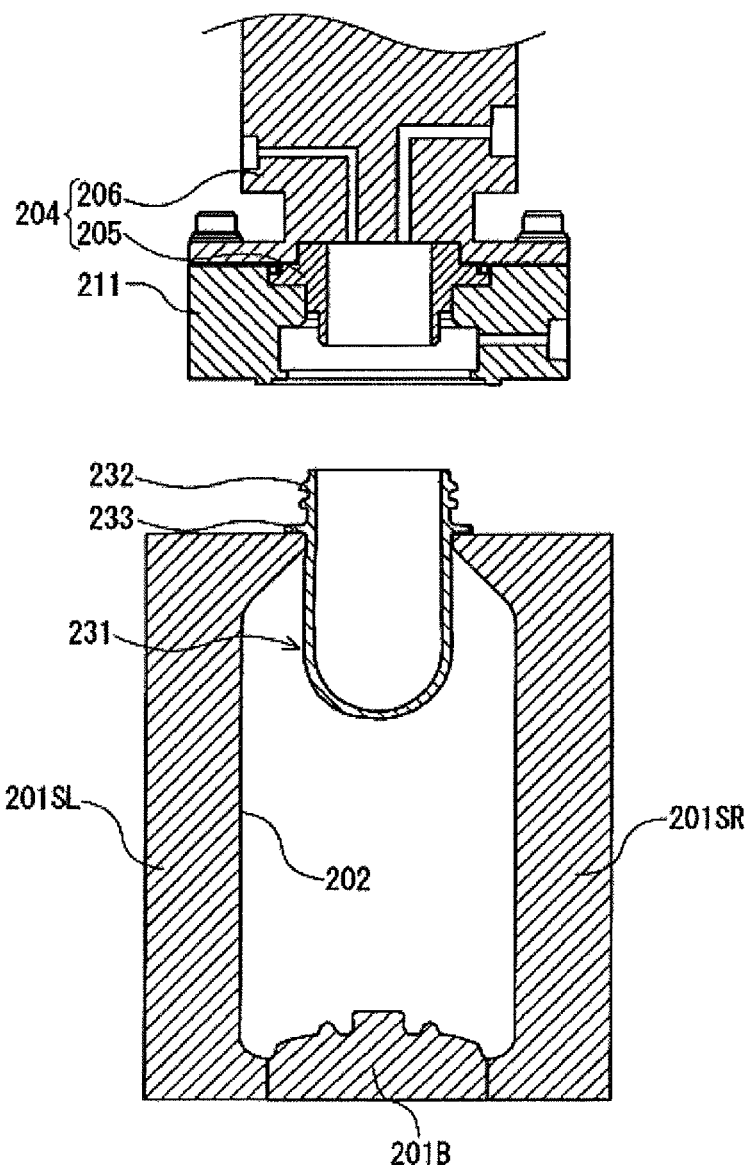
FIG. 12 is a partial sectional view illustrating a state where a preform is fitted to a metal mold, in a molding process by means of the device illustrated in FIG. 11.

(1) As illustrated in FIG. 12, the preform 231 which, except for the mouth tubular portion 232, is heated to a temperature suitable for stretch blow molding is fitted to the metal mold 201 used for blow molding, with the mouth tubular portion 232 being projected upward, and mold closing is performed.

Figure 13:
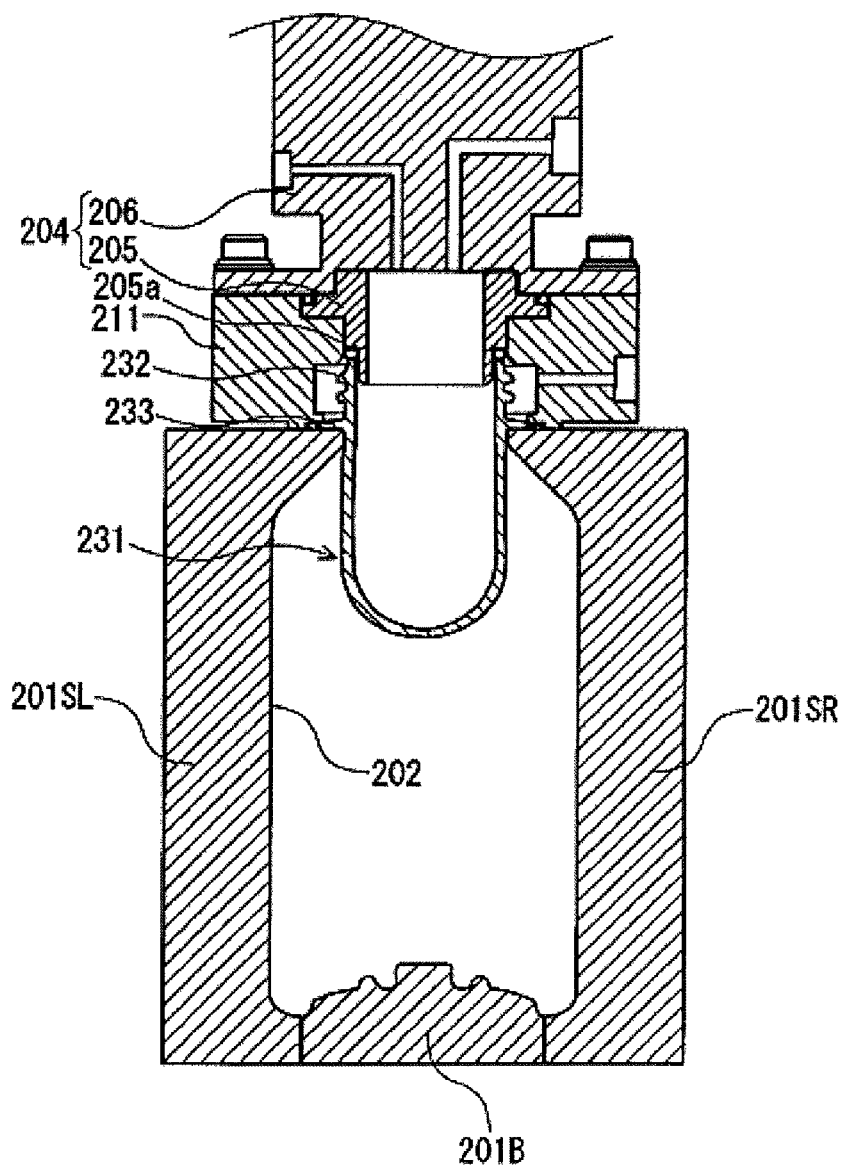
FIG. 13 is a partial sectional view illustrating a state where a blow nozzle is in communication with a mouth tubular portion of the preform, in the molding process by means of the device illustrated in FIG. 1.

(2) As illustrated in FIG. 13, by displacing the partition wall member 211 and the blow nozzle 204, which are assembled and fixed, downward from above the mouth tubular portion 232, the tip portion of the engaging tubular piece 205 is engaged into the mouth tubular portion 232.

Figure 14:
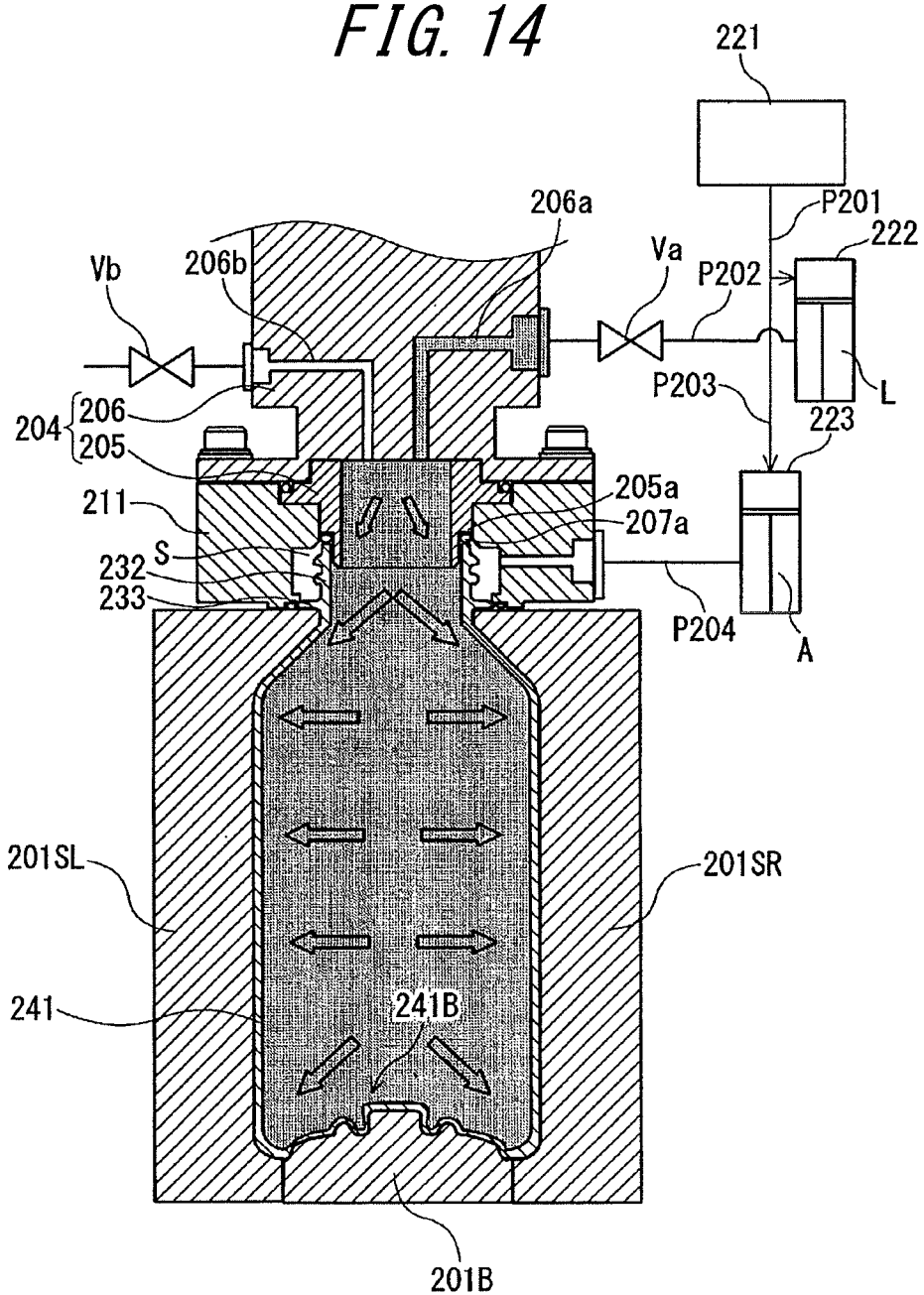
FIG. 14 is a partial sectional view illustrating a state where the preform is inflated and stretched by a pressurized fluid and where a container is shaped, in the molding process by means of the device illustrated in FIG. 11.

Subsequently, (3) as illustrated in FIG. 14, the pressurized liquid L is supplied into the preform 231 from the pressurized liquid supply unit 222 through the through path 206a provided in the guiding tubular portion 206. By doing so, the preform 231 is inflated and stretched, and the container 241 is shaped in accordance with a cavity 202 of the metal mold 201.

(4) After the container 241 is shaped as described above, the supply of the pressurized liquid L is stopped by switching the electromagnetic valve Va into the closed state.

Figure 15:
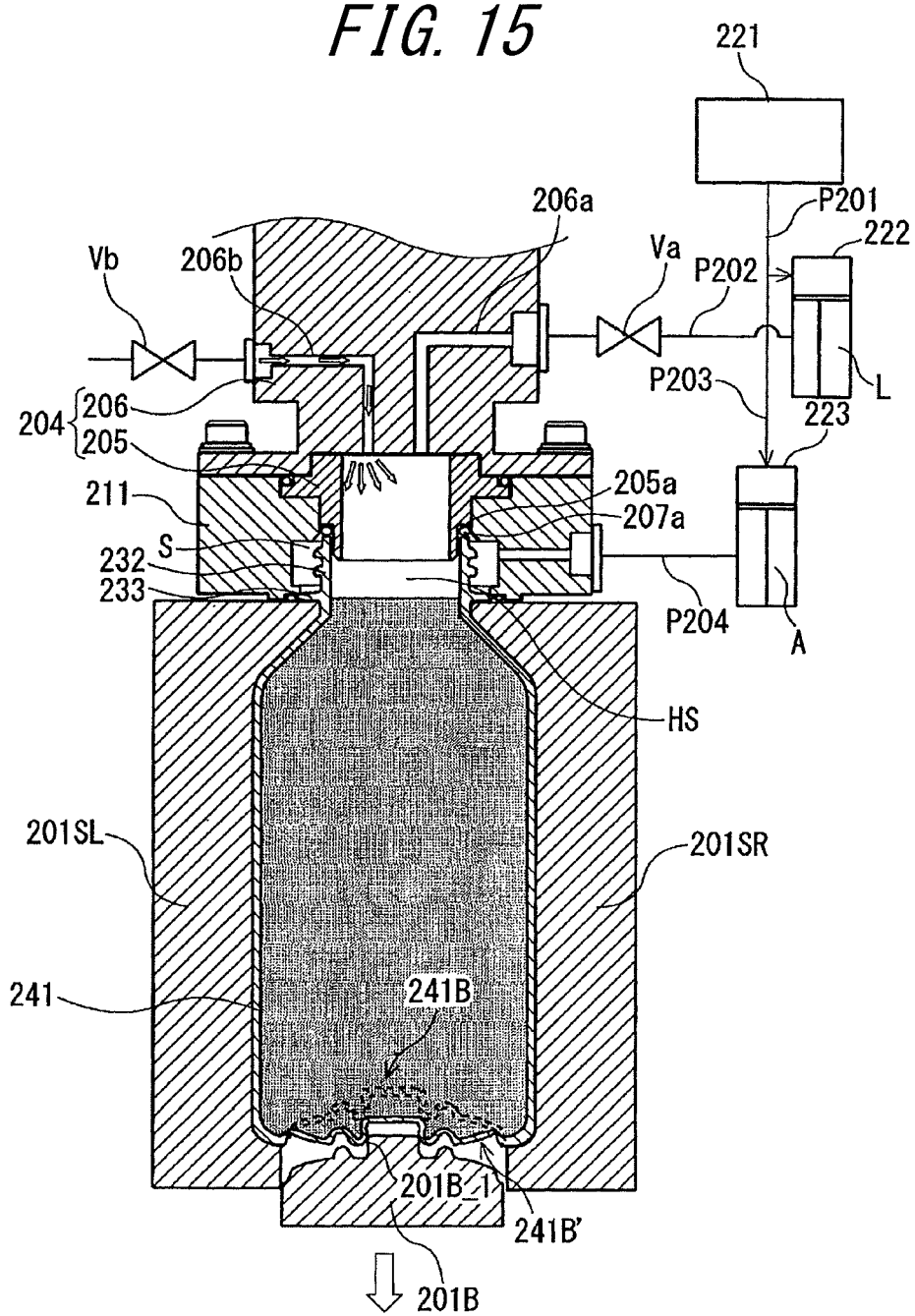
FIG. 15 is a partial sectional view illustrating a state where head space is formed in a mouth portion of the container after a bottom section metal mold is pulled out, in the molding process by means of the device illustrated in FIG. 11.

(5) As illustrated in FIG. 15, in a state where the body section metal molds 201SL, 201SR are closed, the clavately convex portion forming the tapered surface 201B_1 is completely pulled out from the bottom portion 241B of the container 241, while the bottom section metal mold 201B is driven in a pull-out direction and while the electromagnetic valve Vb is switched to the open state for introducing air from an outside to the inside of the container 241. That is to say, in a state where the convex portion, which is the locking portion of the portion section metal mold 201B, is locked into a middle portion of the bottom portion 241B of the container 241, the bottom section metal mold 201B is driven in the pull-out direction away from the bottom portion 241B of the container 241. At this time, a direction in which the bottom portion 241B of the container 241 bulges is inverted from the inside to the outside of the container 241. A volume change of a portion enclosed by the shape of the bottom portion 241B before the bottom section metal mold 201B is pulled out and the shape of the bottom portion 241B' after the bottom section metal mold 201B is pulled out is created in the mouth portion of the container 241 as the head space HS.

(6) Then, the partition wall member 211 and the blow nozzle 204, which are assembled and fixed, are displaced upward to the position illustrated in FIG. 12 above the mouth tubular portion 232. Furthermore, the body section metal molds 201SL, 201SR are opened to extract the container 241 that is filled with the liquid L and formed with the head space HS. The mouth tubular portion 232 of the container 241 is sealed with a cap (which is not illustrated) to obtain a product.

Modified Example 1

Figure 16A:
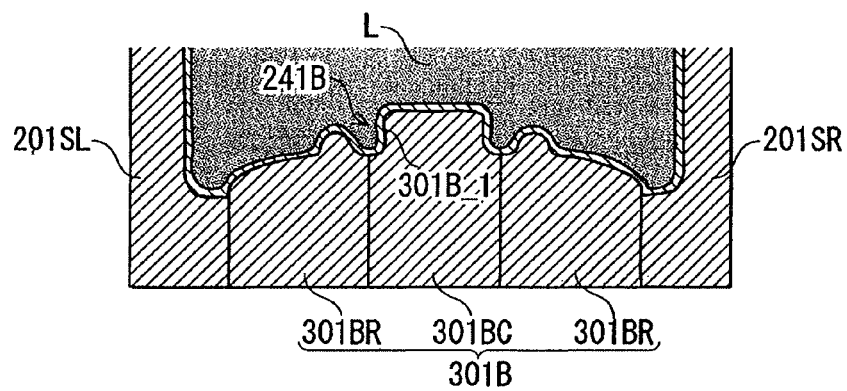
FIG. 16A illustrates a blow molding method using a bottom section metal mold according to a modified example 1 of the third embodiment of the present invention.
Figure 16B:
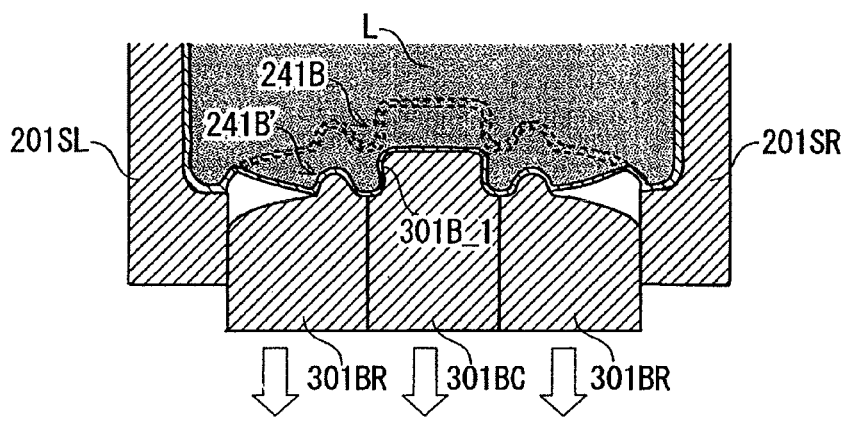
FIG. 16B illustrates a blow molding method using the bottom section metal mold according to the modified example 1 of the third embodiment of the present invention.
Figure 16C:
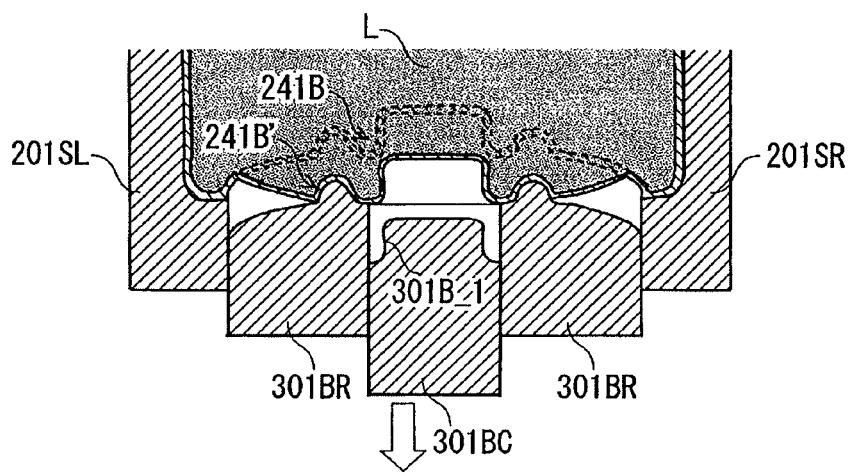
FIG. 16C illustrates a blow molding method using the bottom section metal mold according to the modified example 1 of the third embodiment of the present invention.

FIGS. 16A-16C illustrate a blow molding method using a bottom section metal mold 301B according to a modified example 1 of the third embodiment of the present invention.

As illustrated in FIG. 16A, the bottom section metal mold 301B includes a rod shape metal mold 301BC and a ring-shaped metal mold 301BR surrounding the metal mold 301BC. The bottom section metal mold 301B is provided, in a middle portion thereof, with a clavately convex portion having a tapered surface 301B_1 with an increasing lateral width toward a tip. That is to say, the rod-shaped metal mold 301BC includes a tip portion formed in a convex shape whose diameter increases toward a tip thereof. Unlike the bottom section metal mold 201B, the bottom section metal mold 301B is pulled out in two steps.

In detail, firstly, as illustrated in FIG. 16B, in a state where the body section metal molds 201SL, 201SR are closed, the shape of the bottom portion 241B is inverted to the shape of the bottom portion 241B' by driving the entire bottom section metal mold 301B including the rod-shaped metal mold 301BC and the ring-shaped metal mold 301BR.

Subsequently, as illustrated in FIG. 16C, the rod-shaped metal mold 301BC is displaced further downward so as to pull out the locking portion (i.e. the convex portion).

Then, as in the step (6) described above, the partition wall member 211 and the blow nozzle 204, which are assembled and fixed, are displaced upward to the position illustrated in FIG. 12 above the mouth tubular portion 232. Furthermore, the body section metal molds 201 SL, 201 SR are opened to extract the container 241 that is filled with the liquid L and formed with the head space HS. The mouth tubular portion 232 of the container 241 is sealed with a cap (which is not illustrated) to obtain a product.

Modified Example 2

Figure 17A:
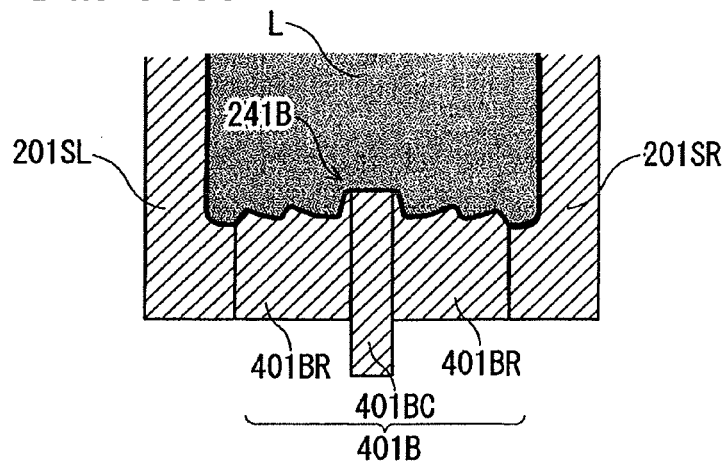
FIG. 17A illustrates a blow molding method using a bottom section metal mold according to a modified example 2 of the third embodiment of the present invention.
Figure 17B:
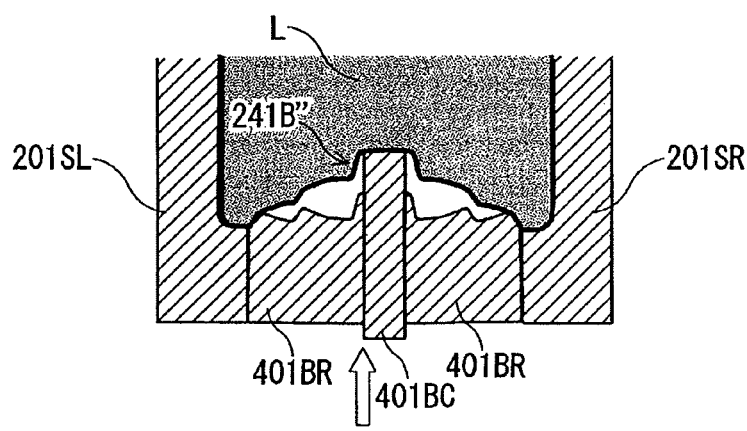
FIG. 17B illustrates a blow molding method using the bottom section metal mold according to the modified example 2 of the third embodiment of the present invention.
Figure 17C:
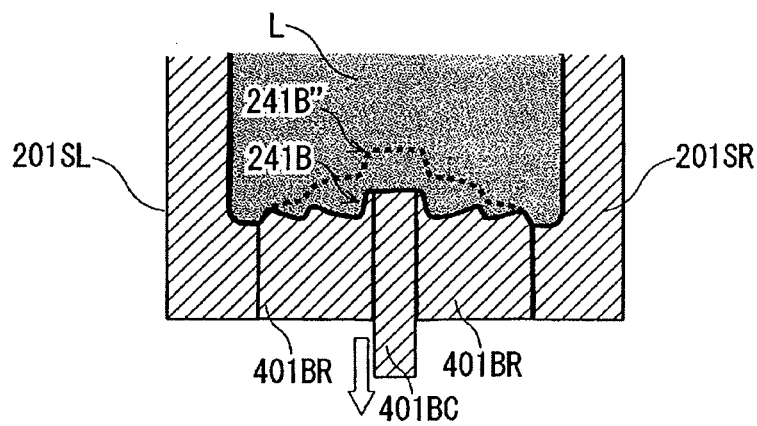
FIG. 17C illustrates a blow molding method using the bottom section metal mold according to the modified example 2 of the third embodiment of the present invention.

FIGS. 17A-17C illustrate a blow molding method using a bottom section metal mold 401B according to a modified example 2 of the third embodiment of the present invention.

As illustrated in FIG. 17A, the bottom section metal mold 401B includes a rod shape metal mold 401BC formed in a middle portion of the bottom section metal mold 401B, and a ring-shaped metal mold 301BR surrounding the metal mold 401BC.

The aforementioned blow molding method using the bottom section metal mold 201B, 301B drives the bottom section metal mold 201B, 301B in the pull-out direction, and, by the locking between the bottom portion 241B of the container 241 and the bottom section metal mold 201B, 301B, inverts the bulging shape of the bottom portion 241B of the container 241 toward the outside of the container 241 (i.e. inverts the bulging shape from the bottom portion 241B to the bottom portion 241B'). At this time, the aforementioned blow molding method also introduces the air into the inside of the container 241. By doing so, the volume change of the portion enclosed by the shape of the bottom portion 241B before the bottom section metal mold 201B, 301B is pulled out and the shape of the bottom portion 241B' after the bottom section metal mold 201B, 301B is pulled out is created in the mouth portion of the container 241 as the head space HS. On the other hand, in the blow molding method using the bottom section metal mold 401B according to the modified example 2, as illustrated in FIG. 17B, by pushing up the rod-shape metal mold 401BC in the middle, the shape of the bottom portion 241B of the container 241 is inverted toward the inside of the container 241. Subsequently, as illustrated in 17C, by driving the ring-shaped metal mold 401BC in the pull-out direction and by introducing the air into the inside of the container 241, the volume change of the portion enclosed by the shape of the bottom portion 241B before the ring-shaped metal mold 401BC is pulled out and the shape of the bottom portion 241B" after the ring-shaped metal mold 401BC is pulled out is created in the mouth portion of the container 241 as the head space HS.

Subsequently, the partition wall member 211 and the blow nozzle 204, which are assembled and fixed, are displaced upward to the position illustrated in FIG. 12 above mouth tubular portion 232. Furthermore, the body section metal molds 201SL, 201SR are opened to extract the container 241 that is filled with the liquid L and formed with the head space HS. The mouth tubular portion 232 of the container 241 is sealed with a cap (which is not illustrated) to obtain a product.

Fourth Embodiment

Figure 18:
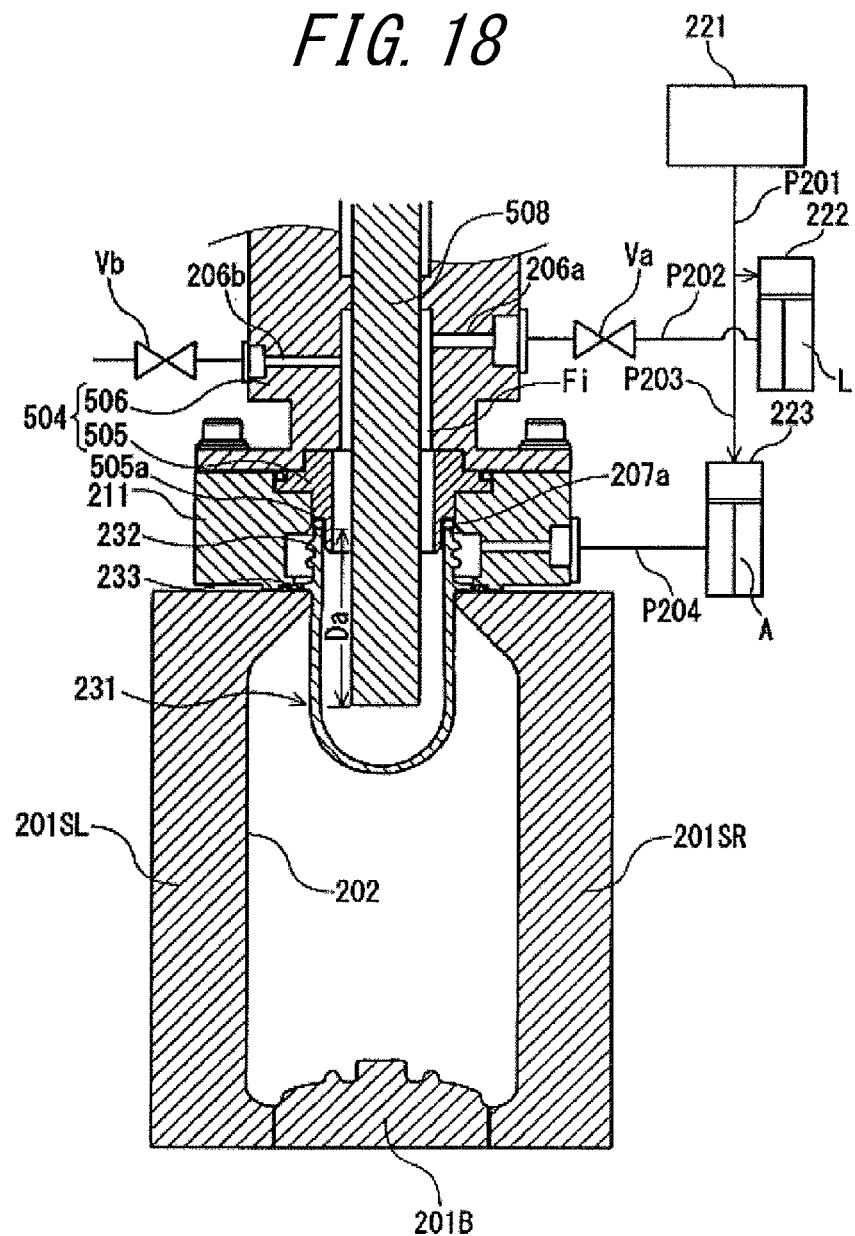
FIG. 18 is a schematic view illustrating an overall structure of a blow molding device according to a fourth embodiment of the present invention.

FIG. 18 is a schematic view illustrating an overall structure of a blow molding device according to a fourth embodiment of the present invention.

The blow molding device according to the fourth embodiment illustrated in FIG. 18 differs in structure from the blow molding device according to the third embodiment illustrated in FIG. 11 in terms of the structure of the blow nozzle and a rod that is added. Specifically, in the blow molding device according to the fourth embodiment, an introduction tubular portion 506 is provided, inside thereof, a cylindrical hollow portion. Furthermore, inside a blow nozzle 504 including an engaging tubular piece 505 and the guiding tubular portion 506, a cylindrical rod 508 is coaxially inserted and disposed for forming the head space HS. By means of the blow nozzle 504 and the rod 508, the cylindrical introduction path Fi is formed in the blow nozzle 504. Besides, a servo mechanism (which is not illustrated) is provided for driving the rod 508. Other structures of the blow molding device according to the fourth embodiment are substantially the same as those of the blow molding device according to the third embodiment illustrated in FIG. 11. Accordingly, the description below of the blow molding method using both the bottom section metal mold 201B and the rod 508 is focused on the above differences. In the blow molding device according to the fourth embodiment, the same elements as those in the blow molding device according to the third embodiment are denoted by the same reference numerals.

In the present embodiment, after the step (2) described in the third embodiment, the following steps (2'), (3'), and (4') are included.

(2') A tip portion of the rod 508 is inserted into the preform 231 by a predetermined length Da (the length Da from the tip of the mouth tubular portion 232 of the preform 231 to the tip of the rod 508).

(3') By supplying the pressurized liquid L into the preform 231 through the through path 206a provided in the guiding tubular portion 506 and through the introduction path Fi, the preform 231 is inflated and stretched, and the container 241 is shaped in accordance with the cavity 202 of the metal mold 201.

Figure 19:
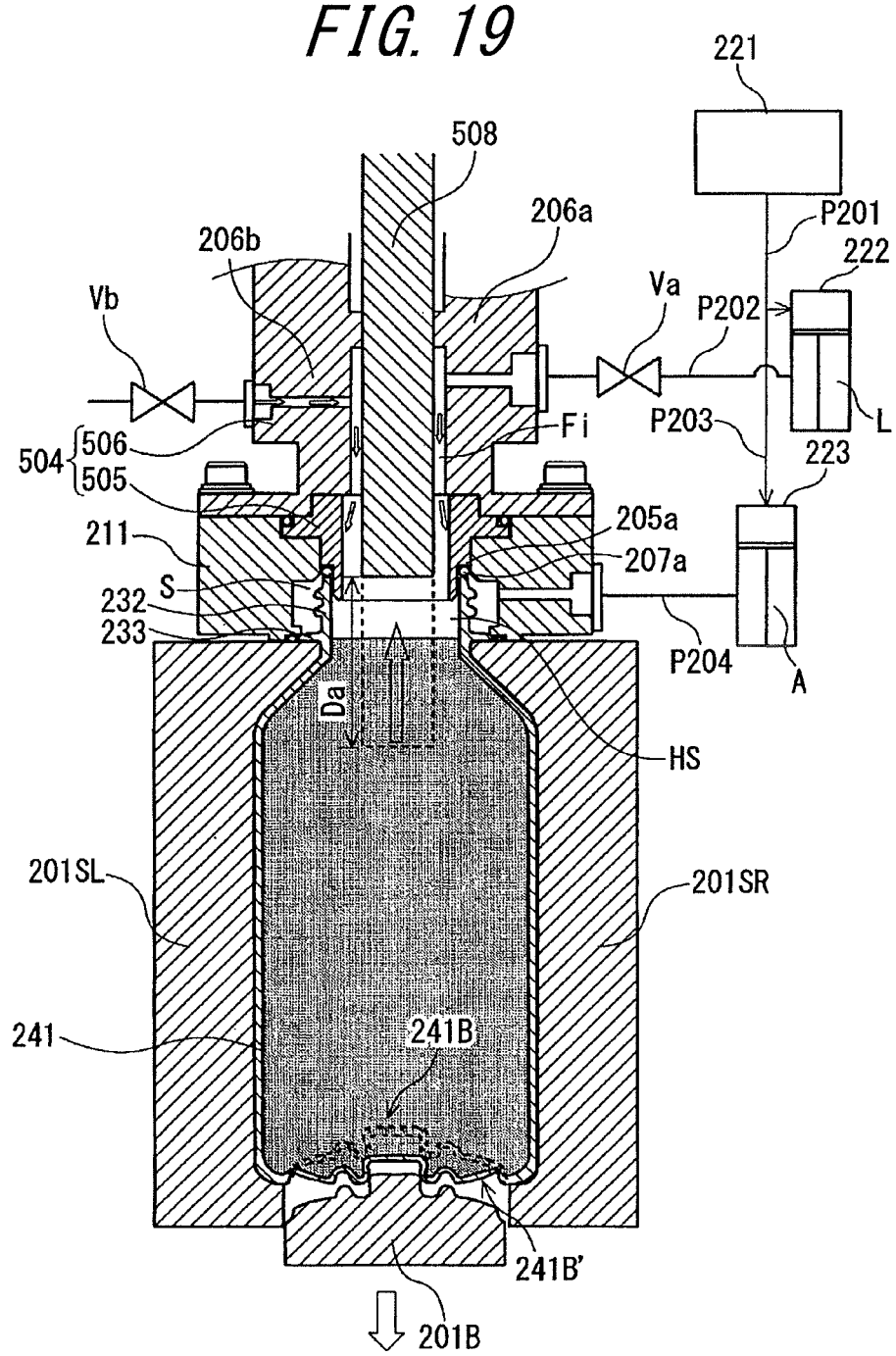
FIG. 19 is a partial sectional view illustrating a state where head space is formed in a mouth portion of a container after a bottom section metal mold and a rod are pulled out, in a molding process by means of the device illustrated in FIG. 18.
Figure 20:
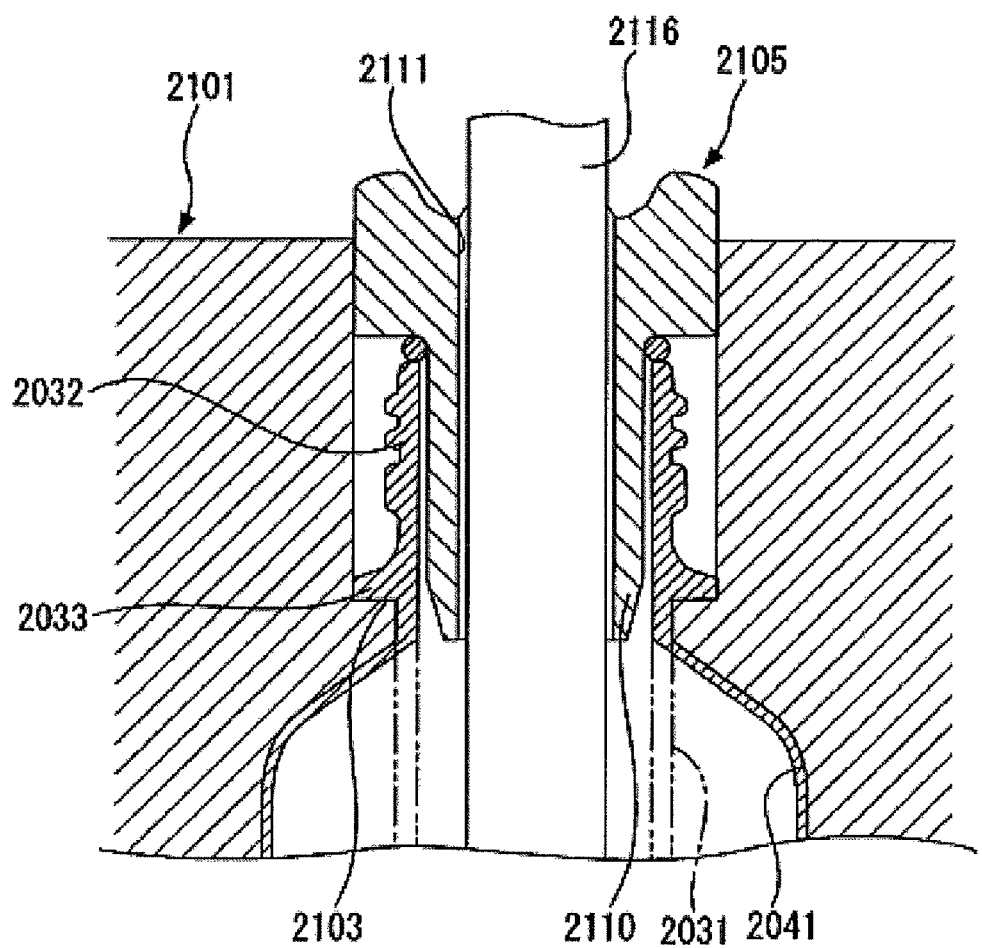
FIG. 20 is a sectional view illustrating a part of a conventional blow molding device.

(4') After the container 241 is shaped, the supply of the pressurized liquid L is stopped by switching the electromagnetic valve Va into the closed state. As illustrated in FIG. 19, in the state where the body section metal molds 201SL, 201SR are closed, the bottom section metal mold 201B is pulled out, and the tip portion of the rod 508 is disinserted from the container 241 so as to be pulled up to reach the tip of the mouth tubular portion 232. The clavately convex portion forming the tapered surface 201B_1 is completely pulled out from the bottom portion 241B of the container 241, while the bottom section metal mold 201B is driven in the pull-out direction and while the electromagnetic valve Vb is switched to the open state for introducing the air from the outside to the inside of the container 241. At this time, a volume change in the bottom portion of the container 241 (in a portion enclosed by the shape of the bottom portion 241B and the shape of the bottom portion 241B') caused by the bottom section metal mold 201B having been pulled out and a volume change (in a portion corresponding to the length Da of the rod 508) caused by the rod 508 having been pulled up are created in the mouth portion of the container 241 as the head space HS.

As described above, in the blow molding method using both the bottom section metal mold 201B and the rod 508, the volume change in the bottom portion of the container 241 resulting from the pulling-out of the bottom section metal mold 201B and the volume change resulting from the pulling-up of the rod 508 are utilized as the head space HS. Furthermore, by adjusting the length Da of insertion into the preform 231, the head space HS may be regulated to be a predetermined volume. In addition, the bottom section metal mold 301B, 401B may also be used instead of the bottom section metal mold 201B.

Thus, according to the blow molding device and the blow molding method using the blow molding device according to the present invention, a predetermined volume of the head space HS is formed in the container that is obtained by blowing a preform in a metal mold with use of a content fluid. As a result, until the step of capping the mouth portion of the container after blow molding, leakage of the content fluid is favorably prevented. Furthermore, since the container has the bottom portion having the shape bulging toward the outside of the container, when the pressure inside the container is decreased, the shape of the bottom portion is restored, and irregular deformation due to the decreased pressure is favorably prevented.

INDUSTRIAL APPLICABILITY

According to a method for manufacturing a container containing a content fluid of the present invention, shrinkage and deformation of the bottle over a passage of time after the sealing step are prevented.

According to a method for positive pressurization of a container of the present invention, an inside of the container is placed under a positive pressure, without using an additional measure such as adding a drip of liquid nitrogen and without compromising productivity compared with a conventional blow molding method using a liquid as the pressure medium. The present invention is expected to be widely used and developed as a method for filling a container with a content fluid.

According to a blow molding method and a blow molding device of the present invention, head space of a liquid, such as a beverage, a cosmetic product, and a pharmaceutical product, that is filled in a final product at the time of shaping of a container is regulated to be a predetermined volume, easily, reproducibly, and reliably. The present invention is expected to be widely used and developed in the field of blow molding.

REFERENCE SIGNS 1 preform
2 mouth portion
10 bottle (container)
15 invertible deforming portion
16 cap body
101 metal mold
102 cavity
104 blow nozzle
105 engaging tubular piece
106 supply tubular portion
106a introduction path
106s seal stepped portion
108 rod
109 seal body
109a shaft body
109t seal tubular piece
109ta tapered edge portion
111 partition wall member
121 pressurizing device
122 pressurized liquid supply unit
123 liquid supply unit
Fs supply path
HS head space
L liquid
Ls liquid surface
P1, P2 pipe
R1 pipe
V1, V2 valve
Vm valve mechanism
131 preform
132 mouth portion
133 neck ring
141 container
142 mouth portion
144 body portion
145 bottom portion
147 cap
201 metal mold
201SR right body section metal mold
201SL left body section metal mold
201B, 301B, 401B bottom section metal mold
301BC, 401BC rod-shaped metal mold
301BR, 401BR ring-shaped metal mold
202 cavity
204, 504 blow nozzle
205, 505 engaging tubular piece
205a circumferential stepped portion
206, 506 guiding tubular portion (supply tubular portion)
206a through path
206b vent hole
508 rod
207a, 207b seal member
211 partition wall member
212 support flange piece
221 pressurizing device
222 pressurized liquid supply unit
223 pressurized air supply unit
A pressurized air
Fi introduction path
HS head space
L (pressurized) liquid P201-P204 pipe
S space
Va, Vb electromagnetic valve
231 preform
232 mouth tubular portion (mouth portion)
233 neck ring
241 container

The invention claimed is:

1. A method for manufacturing a container containing a content fluid, comprising:
a molding step of stretching a bottomed tubular preform that is heated to a temperature at which the preform is stretchable so as to form the container by means of pressure of the content fluid injected into the preform through a mouth portion of the preform;
a sealing step of sealing the content fluid by fitting a cap body to the mouth portion; and
a pressurizing step of increasing an inner pressure of the container, wherein the container includes an invertible deforming portion that is freely invertible and deformable toward an inside of the container, and
in the pressurizing step, after the sealing step before a temperature of the container decreases to a room temperature, the inner pressure of the container is increased by reducing a volume of the container by inverting and deforming the invertible deforming portion toward the inside of the container.

2. The method for manufacturing a container containing the content fluid according to claim 1, wherein the invertible deforming portion is formed in a bottom portion of the container.

3. A method for placing an inside of a container under a positive pressure, comprising:
a molding step of molding the container by blow molding using a liquid as a pressure medium;
a sealing step, after the molding step, of sealing a mouth portion of the container in a state where the container is filled with the liquid; and
a positive pressurization step, after the sealing step, of placing the inside of the container under the positive pressure due to reduction in volume of the container resulting from after-shrinkage of a circumferential wall of the container.

4. The method for placing the inside of the container under the positive pressure according to claim 3, wherein a magnitude of the positive pressure is controlled by setting a temperature of the liquid and a temperature of a metal mold used for the molding step.

5. The method for placing the inside of the container under the positive pressure according to claim 3, wherein the container is made of a polypropylene-based resin.

6. The method for placing the inside of the container under the positive pressure according to claim 3, wherein the container is made of a polyethylene terephthalate resin.

7. A blow molding method, comprising:
a molding step of stretching and blowing a preform in a metal mold by means of a content fluid so as to form a container, the metal mold comprising a body section metal mold; and a bottom section metal mold; and
the head space formation step, after the molding step, of forming head space by driving the bottom section metal mold in a direction in which the bottom section metal mold is pulled out in order to invert a bulging shape of the bottom portion of the container and by introducing air to an inside of the container, in a state where the body section metal mold is closed.

8. The blow molding method according to claim 7, wherein
the bottom section metal mold includes a locking portion configured to be locked into a middle portion of the bottom portion of the container that faces the bottom section metal mold, and
in the head space formation step, the head space is formed by driving the bottom section metal mold from the bottom portion of the container in the direction in which the bottom section metal mold is pulled out in a state where the locking portion included in the bottom section metal mold is locked into the middle portion of the bottom portion of the container in order to invert the bulging shape of the bottom portion of the container toward an outside of the container and by introducing the air to the inside of the container.

9. The blow molding method according to claim 8, wherein the locking portion included in the bottom section metal mold is formed in a convex shape whose diameter increases toward a tip thereof.

10. The blow molding method according to claim 7, wherein
the bottom section metal mold comprises a rod-shaped first metal mold and a ring-shaped second metal mold surrounding the first metal mold, the first metal mold including a tip portion formed in a convex shape whose diameter increases toward a tip thereof, and
in the head space formation step, the head space is formed by driving the bottom section metal mold in the direction in which the bottom section metal mold is pulled out in order to invert the bulging shape of the bottom portion of the container toward an outside of the container and by introducing the air to the inside of the container.

11. The blow molding method according to claim 7, wherein
the bottom section metal mold comprises a rod-shaped first metal mold and a ring-shaped second metal mold surrounding the first metal mold, and
in the head space formation step, the head space is formed by projecting the first metal mold relative to the second metal mold in order to invert the bulging shape of the bottom portion of the container toward the inside of the container and then driving the first metal mold in a direction in which the first metal mold is pulled out in order to invert the bulging shape of the bottom portion of the container and by introducing the air to the inside of the container.

* * * * *